(12) United States Patent
Cao et al.

(10) Patent No.: US 12,141,101 B2
(45) Date of Patent: Nov. 12, 2024

(54) DATA TRANSMISSION METHOD AND RELATED DEVICE

(71) Applicant: HUAWEI TECHNOLOGIES CO., LTD., Shenzhen (CN)

(72) Inventors: Wenyan Cao, Beijing (CN); Dengkui Zhu, Shenzhen (CN); Zhong Du, Nanjing (CN); Guoxiang Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 64 days.

(21) Appl. No.: 17/641,199

(22) PCT Filed: Aug. 29, 2020

(86) PCT No.: PCT/CN2020/112311
§ 371 (c)(1),
(2) Date: Mar. 8, 2022

(87) PCT Pub. No.: WO2021/052147
PCT Pub. Date: Mar. 25, 2021

(65) Prior Publication Data
US 2022/0342850 A1 Oct. 27, 2022

(30) Foreign Application Priority Data
Sep. 18, 2019 (CN) .......................... 201910883159.5

(51) Int. Cl.
G06F 16/16 (2019.01)
G06F 3/0481 (2022.01)
(Continued)

(52) U.S. Cl.
CPC .......... *G06F 16/168* (2019.01); *G06F 3/0481* (2013.01); *G06F 3/04842* (2013.01);
(Continued)

(58) Field of Classification Search
None
See application file for complete search history.

(56) References Cited

U.S. PATENT DOCUMENTS 9,826,078 B2 * 11/2017 Kim ................ H04M 1/724092
10,311,715 B2 * 6/2019 Jopling ................ G06F 3/0488
(Continued)

FOREIGN PATENT DOCUMENTS

CN 102999251 A 3/2013
CN 104246678 A 12/2014
(Continued)

*Primary Examiner* — Lashonda Jacobs-Burton
(74) *Attorney, Agent, or Firm* — Maier & Maier, PLLC

(57) ABSTRACT

The method includes: in a projection scenario, a first device displays, in a first display area of a display, a first user interface of a first application running on the first device, and displays, in a second display area of the display, a second user interface that is being displayed by a second device. The second user interface includes one or more file objects. A user may drag a first file object on the second user interface to the first user interface to release, so that the second device transfers the first file object to the first device. Then, the first device stores the first file object, and provides the first file object for the first application for processing. In embodiments, application data of one device can be directly shared to an application of another device without switching a user interface for a plurality of times.

20 Claims, 23 Drawing Sheets

(51) Int. Cl.
  *G06F 3/04842* (2022.01)
  *G06F 3/0486* (2013.01)
  *G06F 3/14* (2006.01)
  *H04L 67/06* (2022.01)
  *G06F 3/0488* (2022.01)
  *H04L 67/02* (2022.01)

(52) U.S. Cl.
  CPC .......... *G06F 3/0486* (2013.01); *G06F 3/1454* (2013.01); *H04L 67/06* (2013.01); *G06F 3/0488* (2013.01); *H04L 67/02* (2013.01)

(56) References Cited

U.S. PATENT DOCUMENTS

| | | | | |
|---|---|---|---|---|
| 10,445,045 | B2* | 10/2019 | Choi | G06F 3/04842 |
| 10,893,092 | B2* | 1/2021 | Jeong | G06F 3/1454 |
| 10,996,802 | B2* | 5/2021 | Mao | G06F 3/0445 |
| 2010/0262673 | A1* | 10/2010 | Chang | H04L 67/141 |
| | | | | 715/764 |
| 2012/0185790 | A1 | 7/2012 | Bae et al. | |
| 2012/0262494 | A1 | 10/2012 | Choi et al. | |
| 2012/0266093 | A1 | 10/2012 | Park et al. | |
| 2015/0020013 | A1 | 1/2015 | Kim et al. | |
| 2015/0356949 | A1* | 12/2015 | Kim | H04W 4/18 |
| | | | | 345/173 |
| 2016/0126779 | A1 | 5/2016 | Park | |
| 2016/0350055 | A1 | 12/2016 | Ji et al. | |
| 2016/0357426 | A1* | 12/2016 | Chang | G06F 3/1454 |
| 2019/0012059 | A1* | 1/2019 | Kwon | G06F 3/0481 |
| 2019/0056859 | A1* | 2/2019 | Li | G06F 3/04842 |
| 2019/0138144 | A1* | 5/2019 | Wei | G06F 3/04166 |
| 2020/0073510 | A1* | 3/2020 | Mao | G06F 3/04162 |
| 2021/0103366 | A1* | 4/2021 | Behzadi | H04L 67/06 |

FOREIGN PATENT DOCUMENTS

| | | |
|---|---|---|
| CN | 105359121 A | 2/2016 |
| CN | 105493621 A | 4/2016 |
| CN | 105512086 A | 4/2016 |
| CN | 106294843 A | 1/2017 |
| CN | 106354451 A | 1/2017 |
| CN | 109782976 A | 5/2019 |
| CN | 110602805 A | 12/2019 |
| CN | 110618970 A | 12/2019 |
| CN | 111327769 A | 6/2020 |
| JP | 2013161247 A | 8/2013 |
| JP | 2015507264 A | 3/2015 |
| JP | 2016224916 A | 12/2016 |
| TW | 201714049 | 4/2017 |
| WO | 2010058728 A1 | 5/2010 |

\* cited by examiner

DATA TRANSMISSION METHOD AND RELATED DEVICE

This application is a National Stage of International Application No. PCT/CN2020/112311, filed on Aug. 29, 2020, which claims priority to Chinese Patent Application No. 201910883159.5, filed on Sep. 18, 2019. Both of the aforementioned applications are hereby incorporated by reference in their entireties.

TECHNICAL FIELD

The embodiments relate to the field of electronic technologies, and in particular, to a data transmission method and a related device.

BACKGROUND

With rapid development of wireless communications technologies, people may implement data transmission between different devices in a projection scenario through dragging and dropping data in display windows of the different devices. A projection process is as follows: After an electronic device such as a mobile phone establishes a connection to an electronic device such as a laptop configured with a large screen, the mobile phone records a user interface displayed on a display and sends recorded content to the laptop. The laptop displays, in a display area of a display, the recorded content received from the mobile phone. In this way, a user interface of an application (app) on the laptop may be displayed in a first window on the display of the laptop, and a user interface on the display of the mobile phone may be displayed in a second window.

In the projection scenario, a user may perform a drag-and-drop operation to implement data transmission. For example, if the laptop detects a drag-and-drop operation in which the user drags an icon corresponding to a picture from the second window to the first window to release, the mobile phone sends the picture to the laptop, and the laptop receives the picture, and stores the picture in a preset storage address.

If the user wants to insert the picture into a word document in the laptop, the user needs to open a Word application on the laptop, select an option for inserting the picture, find the picture from the preset storage address, and then select to add the picture. Then, the picture is displayed in the word document. It can be learned that, in the foregoing existing data transmission manner, if the user wants to insert a dragged object into a desired application, the user needs to perform a plurality of operations. Consequently, data sharing efficiency is relatively low.

SUMMARY

A data transmission method and a related device permit application data of one device to be directly shared to an application of another device without switching a user interface for a plurality of times in a projection scenario. This improves data sharing efficiency and simplifies a user operation.

According to a first aspect, a data sharing method includes: A first device receives data of a second user interface sent by a second device. The second user interface is a user interface being displayed by the second device, and the second user interface includes one or more file objects. The first device displays a first user interface in a first display area of a display and displays the second user interface in a second display area of the display. The first user interface is a user interface of a first application running on the first device. The first device detects a first selected operation on a file object. In response to the first selected operation, the first device sends, to the second device, first information corresponding to the first selected operation, so that the second device determines the selected first file object based on the first information. The first device detects a first determining operation in the first display area. In response to the first determining operation, the first device sends, to the second device, second information corresponding to the first determining operation, so that the second device sends the first file object to the first device based on the second information. The first device receives the first file object sent by the second device, stores the first file object, and provides a storage path of the first file object or provides the first file object for the first application.

According to the method provided in the first aspect, in a projection scenario, application data of one device can be directly shared to an application of another device without switching a user interface for a plurality of times. This improves data sharing efficiency and simplifies a user operation.

The first file object is one or more file objects in the one or more file objects included in the second user interface. The first information may be an instruction and coordinate information obtained after the first selected operation is converted. For example, the first selected operation is performed on the display of the first device. The coordinate information is coordinate information that is relative to display content of the second device and that is obtained after coordinate information in an original input instruction received by the first device is converted. The instruction is an input instruction that can be recognized by the second device after the original input instruction received by the first device is converted. The second information may be a response to the first determining operation.

With reference to the first aspect, in some embodiments, when detecting an operation on the second user interface, the first device sends a converted instruction and coordinate information of the operation to the second device. The second device may perform a corresponding operation according to the received converted instruction and coordinate information.

With reference to the first aspect, in some embodiments, the first file object may be a text, a picture, a video, audio, a text file, a document (for example, a word, a PPT, or an Excel), or the like. Optionally, when the first file object is a text, the first device receives the first file object sent by the second device, stores the first file object, and provides the first file object for the first application. When the first file object is another non-text file, the first device receives the first file object sent by the second device, stores the first file object, and provides a storage path of the first file object for the first application.

With reference to the first aspect, in some embodiments, different first applications may process the first file object in different manners. In a possible implementation, the first application is a picture editing application or a text editing application, and the first user interface is a picture or text editing interface. After the providing a storage path of the first file object or providing the first file object for the first application, the method further includes: The first device displays the inserted first file object at an editing location of the first user interface. The editing location is a location that is being edited on the first user interface before the first selected operation is detected or is a location corresponding to the first determining operation. The location that is being edited on the first user interface before the first selected operation may be determined by using a cursor on the editing interface. For example, refer to a location of a cursor 502 shown in FIG. 4A. For a manner of displaying the inserted first file object, refer to a user interface 53 shown in FIG. 4D. In this manner, the first file object in the second device may be conveniently inserted into the picture editing application or the text editing application on the first device. This improves data sharing efficiency.

In another possible implementation, the first application is an instant messaging application, and the first user interface is a chat interface of the instant messaging application. After the providing a storage path of the first file object or providing the first file object for the first application, the method further includes: The first device sends the first file object through the first application and displays the first file object in a sent message of the first application. For this possible implementation, refer to the embodiment corresponding to FIG. 5A. The first user interface may be a user interface shown as an example in a window c in FIG. 5A. The first file object may be displayed as an icon 368. In this manner, the first file object in the second device may be conveniently sent through the instant messaging application of the first device. This improves data sharing efficiency.

In another possible implementation, the first application is a document management application. After the providing a storage path of the first file object for the first application, the method further includes: The first device displays a thumbnail of the first file object and name information about the first file object on the first user interface. For this possible implementation, refer to the embodiment corresponding to FIG. 5C. The first user interface may be a user interface shown as an example in a window c in FIG. 5C. The first file object may be displayed as a thumbnail (that is, icon 365). In this manner, the first file object in the second device may be conveniently stored in the document management application of the first device. This improves data sharing efficiency.

In another possible implementation, the first application is an Email application, and the first user interface is an editing interface of a to-be-sent email. After the providing a path of the first file object for the first application, the method further includes: The first device displays the first file object on the first user interface as an attachment of the to-be-sent email. In this manner, the first file object in the second device may be conveniently added as the attachment of the to-be-sent email. This improves data sharing efficiency.

With reference to the first aspect, in some embodiments, the method further includes: The first device displays a status bar in a third display area of the display, where one or more application icons are displayed in the status bar. The first device detects a fourth selected operation on a fourth file object. In response to the fourth selected operation, the first device sends fifth information corresponding to the fourth selected operation to the second device, so that the second device determines the fourth file object based on the fifth information. The first device detects a fourth determining operation of an application icon in the third display area. In response to the fourth determining operation, the first device sends, to the second device, sixth information corresponding to the fourth determining operation, so that the second device sends the fourth file object to the first device based on the sixth information. The first device receives the fourth file object sent by the second device, stores the first file object, and provides a storage path of the first file object or provides the first file object for an application indicated by a determined application icon. For this possible implementation, refer to the embodiment corresponding to FIG. 5D. The first file object may be displayed as fixedly displayed file information. In this manner, the first file object in the second device may be conveniently transferred to an application in the status bar for processing. This improves data sharing efficiency.

With reference to the first aspect, in some embodiments, before the first device sends, to the second device, the second information corresponding to the first determining operation, the first device determines that the first application can receive the first file object. For example, before the first device sends, to the second device, the second information corresponding to the first determining operation, the method further includes: The first device receives file information about the first file object sent by the second device. The file information includes a format and/or a size of the file. The first device determines a preset condition of a file that can be received by the first application. The preset condition indicates a format and/or a maximum file size of a file object that can be received by the first application. The first device determines, based on the preset condition and the file information about the first file object, that the first file object meets the preset condition. In this manner, the first device sends, to the second device, the second information corresponding to the first determining operation only when the first application can process the first file object. This can avoid a problem that a storage space is wasted when the first application cannot process the first file object and the first device receives invalid (or unprocessable) data.

With reference to the first aspect, in some embodiments, the first determining operation acts on a second control in the first display area, and before the first device sends, to the second device, the second information corresponding to the first determining operation, the first device determines that the second control corresponding to the first determining operation can receive the first file object. For example, before the first device sends, to the second device, the second information corresponding to the first determining operation, the method further includes: The first device receives file information about the first file object sent by the second device. The file information includes a format and/or a size of the file. The first device determines a preset condition of a file that can be received by the first control. The preset condition indicates a format and/or a maximum file size of a file object that can be received by the second control. The first device determines, based on the preset condition and the file information about the first file object, that the first file object meets the preset condition. In this manner, the first device sends, to the second device, the second information corresponding to the first determining operation when a program corresponding to the second control can process the first file object. This can avoid a problem that a storage space is wasted when the program corresponding to the second control cannot process the first file object and the first device receives invalid (or unprocessable) data.

With reference to the first aspect, in some embodiments, when determining that the first application cannot receive the selected second file object, the first device may display a prohibitive sign. For example, the method further includes: The first device detects a second selected operation on a second file object. In response to the second selected operation, the first device sends, to the second device, third information corresponding to the second selected operation, so that the second device determines the second file object based on the third information. The first device receives file information about the second file object sent by the second device. The file information includes a format and/or a size of the file. The first device detects a second determining operation in the first display area. In response to the second determining operation, the first device determines a preset condition of a file that can be received by the first application. The preset condition indicates a format and/or a maximum file size of a file object that can be received by the first application. The first device determines, based on the preset condition and the file information about the second file object, that the second file object does not meet the preset condition. The first device displays a prohibitive sign in an area corresponding to the second determining operation. The prohibitive sign is used to indicate that the first application cannot receive the second file object. Further, the first device may display a detailed reason why the first application cannot receive the second file object. For example, a size of the second file object is excessively large, or a format of the second file object is incorrect, and a file format that can be received is XX (which may be a specific format herein), or the like. In this manner, a user may learn, through the prohibitive sign, that the first application cannot process the second file object, and the user may change, based on a prompt of the prohibitive sign, an application that processes a file or adjust a file that needs to be processed.

With reference to the first aspect, in some embodiments, the first device detects a third selected operation on a third file object. In response to the third selected operation, the first device sends, to the second device, fourth information corresponding to the third selected operation, so that the second device determines the third file object based on the fourth information. The first device receives file information about the third file object sent by the second device. The file information includes one or more of a format, a size, an icon, a name, and a creation/modification date of the first file object. The first device generates and displays a file icon based on the file information. The file icon is used to indicate a drag location of the first file object. The first device detects a drag operation on a first control on the first user interface. In response to the drag operation, the first device determines a preset condition of a file that can be received by the first control. The preset condition indicates a format and/or a maximum file size of a file object that can be received by the first control. The first device determines, based on the preset condition and the file information about the third file object, that the third file object does not meet the preset condition. The first device displays a prohibitive sign on the file icon. The prohibitive sign is used to indicate that the first control cannot receive the third file object. For example, for the file icon, refer to an icon 505 in FIG. 4C. In this manner, the user may intuitively view the drag location of the first file object, so that the user can conveniently determine an input location of the first determining operation. For example, for the prohibitive sign, refer to an icon 503 in FIG. 4E. In this manner, the user can conveniently learn that the first control cannot receive the third file object, so that the user can conveniently select a proper control to process the third file object.

With reference to the first aspect, in some embodiments, the first selected operation is a touch-and-hold operation, and the first determining operation is a lift operation. In other words, application data of the second device may be directly shared to an application of the first device through a drag-and-drop operation of dragging the first file object from the second user interface to the first user interface to release, that is, entering an operation. This improves data sharing efficiency and simplifies a user operation. Optionally, the first selected operation may alternatively be a drag operation, or a tap operation, or a double-tap operation, or a force touch (force touch) operation, or the like. The first determining operation may alternatively be the tap operation, or the double-tap operation, or the force touch operation, or the like.

With reference to the first aspect, in some embodiments, the method further includes: The first device detects a touch-and-hold operation on a fifth file object. In response to the touch-and-hold operation, the first device sends, to the second device, seventh information corresponding to the touch-and-hold operation, so that the second device determines the fifth file object based on the seventh information. When the first device detects that a drag operation moves from the second user interface to the first user interface, the first device sends eighth information to the second device, so that the second device sends the fifth file object to the first device based on the eighth information. The first device receives the fifth file object sent by the second device and stores the fifth file object. The first device detects a lift operation in the first display area. In response to the lift operation, the first device provides a storage path of the fifth file object or provides the fifth file object for the first application. In this manner, when the drag operation moves from the second user interface to the first user interface, the first device indicates the second device to send the fifth file object to the first device, so that the first device can receive the fifth file object earlier, thereby improving data sharing efficiency.

According to a second aspect, an embodiment provides a data transmission method. The method includes: A second device sends data of a second user interface to a first device, so that the first device displays the second user interface in a second display area of a display. The second user interface is a user interface being displayed by the second device, and the second user interface includes one or more file objects. A first user interface is displayed in a first display area of the display of the first device, and the first user interface is a user interface of a first application running on the first device. The second device receives first information sent by the first device. The second device determines a selected first file object based on the first information. The first information is information that is received by the first device and that corresponds to a selected operation on a file object. The second device receives second information sent by the first device, and the second device sends the first file object to the first device based on the second information. The first file object is provided for the first application.

According to the method provided in the second aspect, in a projection scenario, application data of one device can be directly shared to an application of another device without switching a user interface for a plurality of times. This improves data sharing efficiency and simplifies a user operation.

With reference to the second aspect, in some embodiments, the method further includes: The second device sends, file information about the first file object to the first device based on the first information. The file information includes one or more of a format, a size, an icon, a name, and a creation/modification date of the file. In this manner, the first device may conveniently display a file icon of the first file object based on the file information.

According to a third aspect, an embodiment provides a data transmission method. The method includes: a first device receives data of a second user interface sent by a second device. The second user interface is a user interface of a second application being displayed by the second device. The first device displays a first user interface in a first display area of a display and displays the second user interface in a second display area of the display. The first user interface is a user interface of a first application running on the first device, and the first user interface includes one or more file objects. The first device detects a first selected operation on a file object. In response to the first selected operation, the first device determines a selected first file object. The first device detects a first determining operation in the second display area. In response to the first determining operation, the first device sends, to the second device, first information corresponding to the first determining operation, so that the second device sends second information to the first device based on the first information. The second information is used to indicate the first device to send the first file object to the second device. The first device sends the first file object to the second device based on the received second information sent by the second device. The first file object is provided for the second application.

According to the method provided in the third aspect, in a projection scenario, application data of one device can be directly shared to an application of another device without switching a user interface for a plurality of times. This improves data sharing efficiency and simplifies a user operation.

According to a fourth aspect, an embodiment provides a data transmission method. The method includes: A second device sends data of a second user interface to a first device, so that the first device displays the second user interface in a second display area of a display. The second user interface is a user interface of a second application being displayed by the second device, a first user interface is displayed in a first display area of the display of the first device, the first user interface is a user interface of a first application running on the first device, and the first user interface includes one or more file objects. The second device receives first information sent by the first device. The first information is information that is corresponding to a first determining operation in the second display area and detected by the first device. The second device sends second information to the first device based on the first information. The second information is used to indicate the first device to send a first file object to the second device, and the first file object is determined by a first selected operation detected by the first device. The second device receives the first file object sent by the first device, stores the first file object, and provides a storage path of the first file object or provides the first file object for the second application.

According to the method provided in the fourth aspect, in a projection scenario, application data of one device can be directly shared to an application of another device without switching a user interface for a plurality of times. This improves data sharing efficiency and simplifies a user operation.

The first file object is one or more file objects in the one or more file objects included in the first user interface. With reference to the fourth aspect, in some embodiments, the first file object may be a text, a picture, a video, audio, a text file, a document (for example, a word, a PPT, or an Excel), or the like. Optionally, when the first file object is a text, the second device receives the first file object sent by the first device, stores the first file object, and provides the first file object for the second application. When the first file object is another non-text file, the second device receives the first file object sent by the first device, stores the first file object, and provides a storage path of the first file object for the second application.

With reference to the fourth aspect, in some embodiments, different second applications may process the first file object in different manners. In a possible implementation, the second application is a picture editing application or a text editing application, and the second user interface is a picture or text editing interface. After the providing a storage path of the first file object or providing the first file object for the second application, the method further includes: The second device displays the inserted first file object at an editing location of the second user interface. The editing location is a location that is being edited on the second user interface before the first selected operation is detected or is a location corresponding to the first determining operation. The location that is being edited on the first user interface before the first selected operation may be determined by using a cursor on the editing interface. In this manner, the first file object in the first device may be conveniently inserted into the picture editing application or the text editing application on the second device. This improves data sharing efficiency.

In another possible implementation, the second application is an instant messaging application, and the second user interface is a chat interface of the instant messaging application. After the providing a storage path of the first file object or providing the first file object for the second application, the method further includes: The second device sends the first file object through the second application and displays the first file object in a sent message of the second application. For this possible implementation, refer to the embodiment corresponding to FIG. 6B. The first user interface may be a user interface shown as an example in a window e in FIG. 6B. The second user interface may be an interface of a WeChat application shown as an example in a window f in FIG. 6B. The first file object may be displayed as an icon 605. In this manner, the first file object in the first device may be conveniently sent through the instant messaging application of the second device. This improves data sharing efficiency.

In another possible implementation, the second application is a document management application. After the providing a storage path of the first file object for the second application, the method further includes: The second device displays a thumbnail of the first file object and name information about the first file object on the second user interface. In this manner, the first file object in the first device may be conveniently stored in the document management application of the second device. This improves data sharing efficiency.

In another possible implementation, the second application is an Email application, and the second user interface is an editing interface of a to-be-sent email. After the providing a path of the first file object for the second application, the method further includes: The second device displays a second file object on the second user interface as an attachment of the to-be-sent email. In this manner, the first file object in the first device may be conveniently added as the attachment of the to-be-sent email in the second device. This improves data sharing efficiency.

In another possible implementation, the second application is a desktop application, the first determining operation acts on an application icon, the second user interface is a home interface of the second device, and the home interface includes one or more application icons. After the providing a path of the first file object for the second application, the method further includes: The second device provides a path of the second file object for an application corresponding to the determined application icon. In this manner, a first file in the first device may be conveniently transferred to an application corresponding to an application icon for processing. This improves data sharing efficiency.

With reference to the fourth aspect, in some embodiments, before the second device sends the second information to the first device based on the first information, the second device determines that the second application can receive the first file object. For example, before the second device sends the second information to the first device based on the first information, the method further includes: The second device receives file information about the first file object sent by the first device. The file information includes a format and/or a size of the file. The second device determines, based on the first information, that a second determining operation is received. The second device determines, based on the second determining operation, a preset condition of a file that can be received by the second application. The preset condition indicates a format and/or a maximum file size of a file object that can be received by the second application. The second device determines, based on the preset condition and the file information about the first file object, that the first file object meets the preset condition. In this manner, the second device sends the second information to the first device only when the second application can process the first file object. This can avoid a problem that a storage space is wasted when the second application cannot process the first file object and the second device receives invalid (or unprocessable) data.

With reference to the fourth aspect, in some embodiments, the first determining operation acts on a third control in the second display area. Before the second device sends the second information to the first device based on the first information, the second device determines that the third control can receive the first file object. For example, before the second device sends the second information to the first device based on the first information, the method further includes: The second device receives file information about the first file object sent by the first device. The file information includes a format and/or a size of the file. The second device determines a preset condition of a file that can be received by the first control. The preset condition indicates a format and/or a maximum file size of a file object that can be received by the first control. The second device determines, based on the preset condition and the file information about the first file object, that the first file object meets the preset condition. In this manner, the second device sends the second information to the first device only when a program corresponding to the third control can process the first file object. This can avoid a problem that a storage space is wasted when the program corresponding to the third control cannot process the first file object and the second device receives invalid (or unprocessable) data.

With reference to the fourth aspect, in some embodiments, when determining that the second application cannot receive the selected second file object, the second device may display a prohibitive sign, or send fourth information to the first device. The fourth information is used to indicate the first device to display the prohibitive sign. For example, the method further includes: The second device receives file information about the second file object sent by the first device. The file information includes a format and/or a size of the file. The second file object is determined by a second selected operation detected by the first device. The second device receives third information sent by the first device. The third information is information that is corresponding to a third determining operation in the second display area and detected by the first device. The second device determines, based on the third information, that a fourth determining operation is received. In response to the fourth determining operation, the second device determines a preset condition of a file that can be received by the second application. The preset condition indicates a format and/or a maximum file size of a file object that can be received by the second application. The second device determines, based on the preset condition and the file information about the second file object, that the second file object does not meet the preset condition. The second device sends fourth information to the first device. The fourth information is used to indicate the first device to display the prohibitive sign in an area corresponding to the third determining operation. The prohibitive sign is used to indicate that the second application cannot receive the second file object. Alternatively, the second device displays the prohibitive sign in an area corresponding to the fourth determining operation on the second user interface. The prohibitive sign is used to indicate that the second application cannot receive the second file object. Further, the first device or the second device may display a detailed reason why the second application cannot receive the second file object. For example, a size of the second file object is excessively large, or a format of the second file object is incorrect, and a file format that can be received is XX (which may be a specific format herein), or the like. In this manner, a user may learn, through the prohibitive sign, that the second application cannot process the second file object, and the user may change, based on a prompt of the prohibitive sign, an application that processes a file or adjust a file that needs to be processed.

With reference to the fourth aspect, in some embodiments, the method further includes: The second device receives file information about a third file object sent by the first device. The file information includes a format and/or a size of the third file object, and the third file object is determined by a second selected operation detected by the first device. The second device receives fourth information sent by the first device. The fourth information is information corresponding to a drag operation detected by the first device on a first control in the second display area, and a file icon of the third file object is displayed at a location of the drag operation. The second device determines, based on the fourth information, a preset condition of a file that can be received by the first control. The preset condition indicates a format and/or a maximum file size of a file object that can be received by the first control. The second device determines, based on the preset condition and the file information about the third file object, that the third file object does not meet the preset condition. The second device sends fifth information to the first device. The fifth information is used to indicate the first device to display a prohibitive sign in the file icon. The prohibitive sign is used to indicate that the first control cannot receive the third file object. In this manner, the user can conveniently learn that the first control cannot receive the third file object, so that the user can conveniently select a proper control to process the third file object.

With reference to the fourth aspect, in some embodiments, the method further includes: The second device receives file information about a fourth file object sent by the first device. The file information includes one or more of a format, a size, an icon, a name, and a creation/modification date of the fourth file object. The fourth file object is determined by a third selected operation detected by the first device. The second device receives sixth information sent by the first device. The sixth information is information corresponding to a drag operation detected by the first device on a second control in the second display area, and the sixth information indicates a location of the drag operation. The second device displays a file icon of the fourth file object at the location of the drag operation based on the file information and the sixth information. The second device determines, based on the sixth information, a preset condition of a file that can be received by the second control. The preset condition indicates a format and/or a maximum file size of a file object that can be received by the second control. The second device determines, based on the preset condition and the file information about the fourth file object, that the fourth file object does not meet the preset condition. The second device displays a prohibitive sign on the file icon. The prohibitive sign is used to indicate that the second control cannot receive the fourth file object. In this manner, the user can conveniently learn that the second control cannot receive the fourth file object, so that the user can conveniently select a proper control to process the fourth file object.

With reference to the fourth aspect, in some embodiments, the first selected operation is a touch-and-hold operation, and the first determining operation is a lift (lift) operation of a drag operation. In other words, application data of the second device may be directly shared to an application of the first device through a drag-and-drop operation of dragging the first file object from the second user interface to the first user interface to release, that is, entering an operation. This improves data sharing efficiency and simplifies a user operation. Optionally, the first selected operation may alternatively be a drag operation, or a tap operation, or a double-tap operation, or a force touch (force touch) operation, or the like. The first determining operation may alternatively be the tap operation, or the double-tap operation, or the force touch operation, or the like.

According to a fifth aspect, an embodiment provides a data transmission method. The method includes: A first device receives data of a second user interface sent by a second device. The second user interface is a user interface being displayed by the second device, and the second user interface includes one or more file objects. The first device displays a first user interface in a first display area of a display and displays the second user interface in a second display area of the display. The first user interface is a user interface of a first application running on the first device. The first device detects a touch-and-hold operation on a file object. In response to the touch-and-hold operation, the first device sends, to the second device, an instruction and coordinate information corresponding to the touch-and-hold operation, so that the second device determines a selected file object based on the instruction and coordinate information corresponding to the touch-and-hold operation. The first device detects a lift operation in the first display area. In response to the lift operation, the first device sends, to the second device, an instruction and information corresponding to the lift operation, so that the second device sends the file object to the first device based on the instruction and coordinate information corresponding to the lift operation. The first device receives the file object sent by the second device, stores the first file object, and provides a storage path of the file object or provides the file object for the first application.

According to the method provided in the fifth aspect, in a projection scenario, application data of one device can be directly shared to an application of another device without switching a user interface for a plurality of times. This improves data sharing efficiency and simplifies a user operation.

According to a sixth aspect, an embodiment provides a data transmission method. The method includes: A second device sends data of a second user interface to a first device, so that the first device displays the second user interface in a second display area of a display. The second user interface is a user interface of a second application that is being displayed by the second device and that runs on the second device, a first user interface is displayed in a first display area of the display of the first device, the first user interface is a user interface of a first application running on the first device, and the first user interface includes one or more file objects. The second device receives first information sent by the first device. The first information is information that is corresponding to a lift operation in the second display area and detected by the first device. The second device sends second information to the first device based on the first information. The second information is used to indicate the first device to send a first file object to the second device, and the first file object is determined by a touch-and-hold operation detected by the first device. The second device receives the first file object sent by the first device, stores the first file object, and provides a storage path of the first file object or provides the first file object for the second application.

According to the method provided in the sixth aspect, in a projection scenario, application data of one device can be directly shared to an application of another device without switching a user interface for a plurality of times. This improves data sharing efficiency and simplifies a user operation.

According to a seventh aspect, an embodiment provides an electronic device. The electronic device is used as a first device, and the electronic device includes: one or more processors, a memory, and a display. The memory is coupled to the one or more processors, the memory is configured to store program code, and the one or more processors invoke the program code, so that the electronic device is enabled to perform the method described in any one of the first aspect or the possible implementations of the first aspect; or perform the method described in any one of the third aspect or the possible implementations of the third aspect; or perform the method described in any one of the fifth aspect or the possible implementations of the fifth aspect.

According to an eighth aspect, an embodiment provides an electronic device. The electronic device is used as a second device, and the electronic device includes: one or more processors, a memory, and a display. The memory is coupled to the one or more processors, the memory is configured to store program code, and the one or more processors invoke the program code, so that the electronic device is enabled to perform the method described in any one of the second aspect or the possible implementations of the second aspect; or perform the method described in any one of the fourth aspect or the possible implementations of the fourth aspect; or perform the method described in any one of the sixth aspect or the possible implementations of the sixth aspect.

According to a ninth aspect, a computer program product may include instructions. When the computer program product runs on an electronic device, the electronic device is enabled to perform the method described in any one of the first aspect to the sixth aspect or any possible implementation of the first aspect to the sixth aspect.

According to a tenth aspect, a non-transitory computer-readable storage medium may include instructions. When the instructions are run on an electronic device, the electronic device is enabled to perform the method described in any one of the first aspect to the sixth aspect or any possible implementation of the first aspect to the sixth aspect.

According to the solution provided, in a projection scenario, application data of one device can be directly shared to an application of another device without switching a user interface for a plurality of times. This improves data sharing efficiency and simplifies a user operation.

DETAILED DESCRIPTION OF THE EMBODIMENTS

Figure 1A:
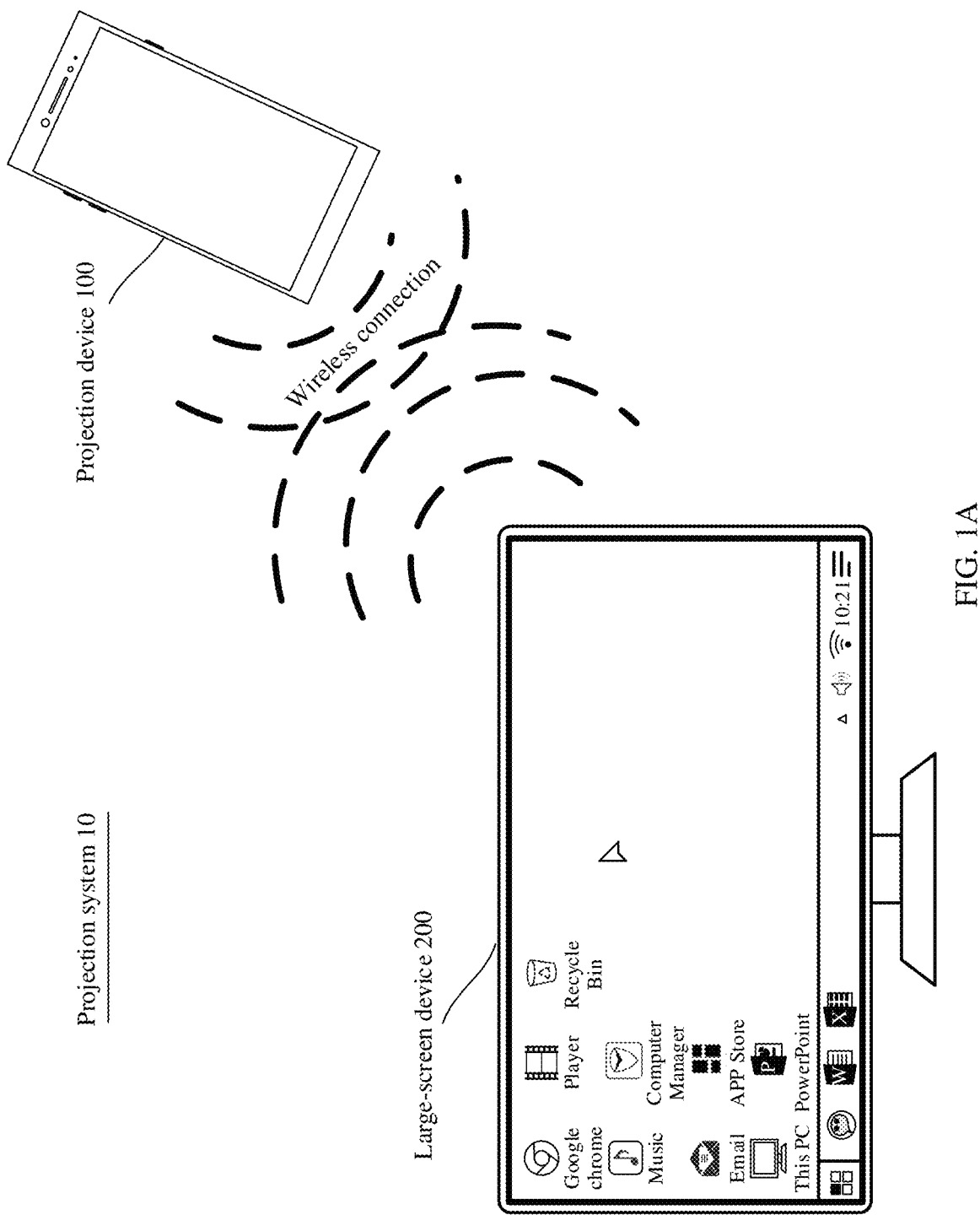
FIG. 1A is a schematic diagram of a projection system according to an embodiment.

The solutions in the embodiments are clearly described in detail in the following with reference to the accompanying drawings. In descriptions of the embodiments, unless otherwise stated, "/" indicates "or". For example, A/B may indicate A or B. The term "and/or" merely describes an association relationship for describing associated objects and indicates that three relationships may exist. For example, A and/or B may indicate the following three cases: Only A exists, both A and B exist, and only B exists. In addition, in the descriptions of the embodiments, "a plurality of" means two or more.

The following terms "first" and "second" are merely intended for a purpose of description and shall not be understood as an implication of relative importance or implicit indication of a quantity of indicated features. Therefore, a feature limited by "first" or "second" may explicitly or implicitly include one or more features.

A term "user interface (UI)" is a medium interface for interaction and information exchange between a user and an application or an operating system and implements conversion between an internal form of information and a form acceptable to the user. A user interface of an application is source code written in a specific computer language such as Java or an extensible markup language (XML). The interface source code is parsed and rendered on an electronic device and is finally presented as content that can be identified by the user, for example, a control such as a picture, a text, or a button. A control is a basic element of a user interface. Typical controls include a button, a widget, a toolbar, a menu bar, a text box, a scrollbar, a picture, and a text. An attribute and content of the control in the interface are defined by using a tag or a node. For example, the control included in the interface is defined in the XML by using a node such as <Textview>, <ImgView>, or <VideoView>. One node corresponds to one control or attribute in the interface. After being parsed and rendered, the node is displayed as user-visible content. In addition, interfaces of many applications such as a hybrid application usually further include a web page. A web page, also referred to as a page, may be understood as a special control embedded in an interface of an application. A web page is source code written in a specific computer language, such as a hypertext markup language (HTML), cascading style sheets (CSS), or JavaScript (JS). Web page source code may be loaded and displayed as user-recognizable content by a browser or a web page display component with a function similar to a function of the browser. Specific content included in the web page is also defined by tags or nodes in the web page source code. For example, elements and attributes of a web page are defined by <p>, <img>, <video>, and <canvas> in the HTML.

A common representation form of the user interface is a graphical user interface (GUI), a user interface that is displayed in a graphical manner and related to a computer operation. The graphical user interface may be an interface element such as a window or a control displayed on a display of the electronic device.

The following embodiments provide a data transmission method and a related device, so that application data of one device can be directly shared to an application of another device without switching a user interface for a plurality of times in a projection scenario. This improves data sharing efficiency and simplifies a user operation.

In the following embodiments, in a projection scenario in which a portable electronic device (referred to as a projection device for short below) such as a mobile phone projects content being displayed on a display to a display of an electronic device (referred to as a large-screen device for short below) configured with a larger screen, such as a laptop, the display of the large-screen device may simultaneously display a first window and a second window. The first window is used to display content that is being displayed on the display of the projection device and sent by the projection device, and the second window is used to display a user interface of an app in the large-screen device. Generally, a size of the display of the large-screen device is greater than a size of the display of the projection device. In a projection manner, the user can conveniently view content displayed on the display of the projection device.

In some possible implementations, in the projection scenario described above, if the large-screen device detects a drag-and-drop (drag-and-drop) operation in which a user drags a file object in the first window to a control in the second window to release, the projection device sends data of the file object to the large-screen device. After the large-screen device receives the data of the file object, the large-screen device stores the data of the file object in a preset storage space and generates a storage path corresponding to the data of the file object. Then, the large-screen device sends the storage path to an application corresponding to the second window. The application may read the data of the file object based on the storage path and process the data of the file object based on a program corresponding to the control (for example, display the data or an icon of the file object, send the data of the file object, or store the data of the file object to a specified storage space).

The file object in the first window is a control that can be dragged and dropped. It should be noted that whether a control can be dragged and dropped may be determined during application design corresponding to the first window. For example, the file object may be a document control, a picture control, a video control, an audio control, or the like. In a possible implementation, when the projection device detects a tap operation acting on the file object, the projection device locally reads the data of the file object and displays and/or plays the file.

In some other possible implementations, if the large-screen device detects a drag-and-drop operation in which the user drags a file object in the second window to a control of the first window to release, the large-screen device sends data of the file object in the second window to the projection device. After the projection device receives the data of the file object, the projection device stores the data of the file object in a preset storage space and generates a storage path corresponding to the data of the file object. Then, the projection device sends the storage path to an application corresponding to the first window. The application may read the data of the file object based on the storage path and process the data of the file object based on a program corresponding to the control (for example, display the data or an icon of the file object, send the data of the file object, or store the data of the file object to a specified storage space). In this way, in a projection scenario, application data of one device can be directly shared to an application of another device without switching a user interface for a plurality of times. This improves data sharing efficiency and simplifies a user operation.

The following describes a projection system provided in the embodiments. FIG. 1A is a schematic diagram of a projection system according to the embodiments. The projection system 10 may include a projection device 100 and a large-screen device 200.

The projection device 100 may be an electronic device having a projection function, such as a mobile terminal, a wearable device, or a tablet computer. Optionally, the projection device 100 may run an operating system such as Android, IOS, Windows Phone, Linux, or Windows. The large-screen device 200 may be an electronic device that is configured with a larger display and has a projection function, such as a tablet computer, a personal computer, a palmtop computer, a projector, or a television. Optionally, the large-screen device 200 may run an operating system such as Android, IOS, Windows Phone, Windows, or Linux. Operating systems of the projection device 100 and the large-screen device 200 may be the same or may be different. It should be noted that, in the embodiments, an example in which the projection device 100 runs an Android operating system and the large-screen device runs a Windows operating system is used for description. However, the embodiments are not limited to the two operating systems. The projection device 100 and the large-screen device 200 may further run another operating system. This is not limited in the embodiments.

In the embodiments, the projection device 100 and the large-screen device 200 may establish a connection by using a near field discovery technology such as Bluetooth (BT), a wireless local area network (WLAN) (for example, a wireless fidelity (Wi-Fi) network), or near field communication (NFC). After the connection is established between the projection device 100 and the large-screen device 200, data transmission may be performed by using technologies such as BT, Wi-Fi, and NFC. It should be noted that the technology for establishing a connection between the projection device 100 and the large-screen device 200 may be the same as or may be different from the technology used for data transmission. For example, the projection device 100 and the large-screen device 200 may establish a connection relationship by using the Bluetooth technology. Then, the projection device 100 and the large-screen device 200 may transmit data by using the Wi-Fi technology.

Figure 1B:
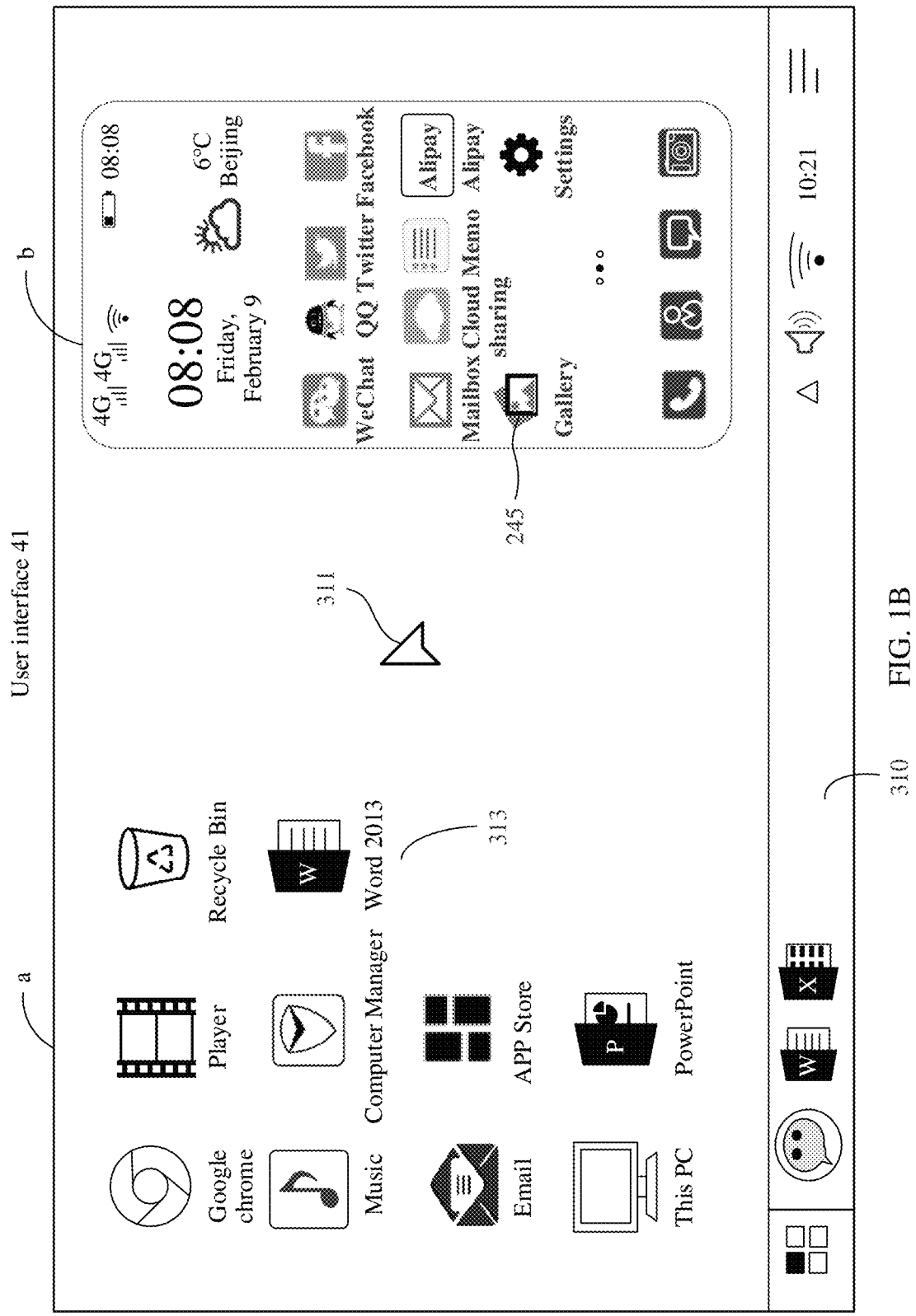
FIG. 1B is a schematic diagram of a user interface on a display of a large-screen device in a projection scenario according to an embodiment.

FIG. 1B is a schematic diagram of a user interface 41 on a display of a large-screen device in a projection scenario according to the embodiments. In this example, a projection device is a smartphone, and the large-screen device is a laptop. After the smartphone is projected to the laptop, the smartphone records content (for example, "home screen (home screen)") being displayed on a display and sends the recorded content to the laptop. The laptop receives the recorded content sent by the smartphone and displays the received recorded content in a display area of the display.

As shown in FIG. 1B, the user interface 41 includes a window a, a window b, and a taskbar 310. The window a is configured to display a desktop of the laptop, and the window b is configured to display the content (that is, the home screen) displayed on the display of the smartphone. Optionally, the window b may be displayed on top, in other words, the window b is always displayed above other windows.

The taskbar 310 may include a start control, an icon of one or more applications (for example, a WeChat icon, a Word icon, and an Excel icon shown in the figure), a more control, a volume control, a network connection indicator, a time indicator, and a notification control. Optionally, the user interface 41 may further include a mouse pointer 311. The mouse pointer 311 may indicate a current position of a mouse on the user interface. A position of the mouse pointer may change as the mouse slides or as a finger of a user slides on a touchpad. The user may tap a Word application icon 313 in the window a. In response to the tap operation, the laptop switches the window a from displaying the desktop to displaying a user interface of a Word application. The user may further tap a gallery application icon 245 in the window b. In response to the tap operation, the display of the smartphone switches from displaying the home screen to displaying a user interface of a gallery application. As display content on the smartphone changes, the laptop switches the window b from displaying the home screen of the smartphone to displaying the user interface of the Word application in the smartphone.

In addition, the laptop may receive a drag operation performed by the user on an edge of the window b by using the mouse pointer 311. In response to the drag operation, the laptop changes a size of the window b. It should be noted that a size of the displayed content of the smartphone in the window b may be the same as a size of the content being displayed on the display of the smartphone. The displayed content of the smartphone in the window b may further be enlarged display of the content being displayed on the display of the smartphone. In addition, after the smartphone is projected to the laptop, if the user wants to change a user interface displayed on the smartphone, the user may perform an operation on the window b on the laptop and may further perform an operation on the display of the smartphone.

Figure 2A:
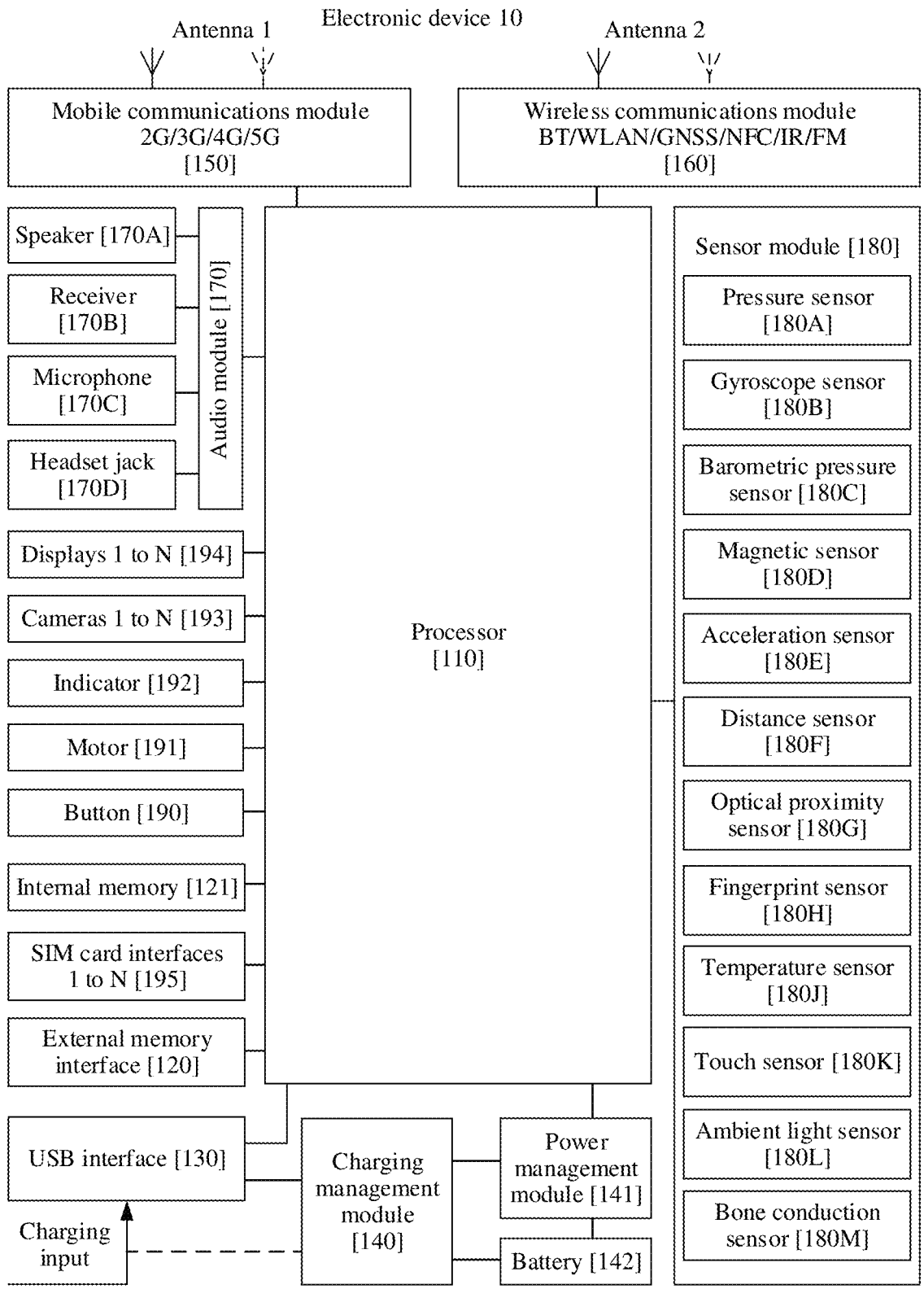
FIG. 2A is a schematic diagram of a structure of an electronic device according to an embodiment.

The following describes hardware structures of the projection device 100 and the large-screen device 200. In the embodiments, the projection device 100 may be an electronic device. The following describes an electronic device 10 in the embodiments. FIG. 2A is a schematic diagram of a structure of the electronic device 10 according to the embodiments.

The electronic device 10 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be understood that the electronic device 10 shown in FIG. 2A is merely an example, and the electronic device 10 may include more or fewer components than those shown in FIG. 2A, may combine two or more components, or may have different component configurations. Various components shown in the figure may be implemented in hardware that includes one or more signal processing and/or application-specific integrated circuits, software, or a combination of hardware and software.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices or may be integrated into one or more processors.

The controller may be a nerve center and a command center of the electronic device 10. The controller may generate an operation control signal based on instruction operation code and a time sequence signal, to complete control of instruction fetching and instruction execution.

A memory may be further disposed in the processor 110 and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronous serial bus and includes one serial data line (SDA) and one serial clock line (SCL). The processor 110 may be coupled to the touch sensor 180K through the I2C interface, so that the processor 110 communicates with the touch sensor 180K through an I2C bus interface, to implement a touch function of the electronic device 10.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170.

The PCM interface may also be configured to: perform audio communication, and sample, quantize, and code an analog signal. In some embodiments, the audio module 170 may be coupled to the wireless communications module 160 through a PCM bus interface.

The UART interface is a universal serial data bus and is configured to perform asynchronous communication. The bus may be a two-way communications bus. The bus switches to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the display 194 through the DSI interface, to implement a display function of the electronic device 10.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like.

The USB interface 130 is an interface that conforms to USB standard specifications, and may be a mini USB interface, a micro USB interface, a USB Type-C interface, or the like. The USB interface 130 may be used to connect to a charger for charging the electronic device 10 or may be used to transmit data between the electronic device 10 and the peripheral device.

It may be understood that an interface connection relationship between the modules that is shown in this embodiment is merely an example for description and does not constitute a limitation on the structure of the electronic device 10. In some other embodiments, the electronic device 10 may alternatively use an interface connection manner different from that in the foregoing embodiment, or a combination of a plurality of interface connection manners.

The charging management module 140 is configured to receive a charging input from the charger. The charger may be a wireless charger or a wired charger. The charging management module 140 may further supply power to the electronic device through the power management module 141 when charging the battery 142.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like.

A wireless communication function of the electronic device 10 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 10 may be configured to cover one or more communications frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a solution that is applied to the electronic device 10 and that includes wireless communication such as 2G, 3G, 4G, and 5G. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to a modem processor for demodulation. The mobile communications module 150 may further amplify a signal modulated by the modem processor and convert the signal into an electromagnetic wave for radiation through the antenna 1.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits an obtained signal to the application processor. The application processor outputs a sound signal by using an audio device (which is not limited to the speaker 170A, the receiver 170B, or the like), or displays an image or a video by using the display 194.

The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, and the like and that is applied to the electronic device 10. The wireless communications module 160 may be one or more components integrating at least one communications processor module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2. In the embodiments of this application, the electronic device 10 may establish a connection to the large-screen device through the wireless communications module 160 and transmit data in an application.

In some embodiments, the antenna 1 of the electronic device 10 is coupled to the mobile communications module 150, and the antenna 2 is coupled to the wireless communications module 160, so that the electronic device 10 may communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like.

The electronic device 10 implements a display function through a GPU, the display 194, the application processor, and the like. The GPU is a microprocessor for image processing and is connected to the display 194 and the application processor. The GPU is configured to: perform mathematical and geometric calculation and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 10 may include one or N displays 194, where N is a positive integer greater than 1.

The electronic device 10 may implement a photographing function through an ISP, the camera 193, a video codec, the GPU, the display 194, the application processor, and the like.

The ISP is configured to process data fed back by the camera 193. For example, during photographing, a shutter is pressed, and light is transmitted to a photosensitive element of a camera through a lens. An optical signal is converted into an electrical signal. The photosensitive element of the camera transmits the electrical signal to the ISP for processing and converts the electrical signal into a visible image.

The camera 193 is configured to capture a static image or a video. In some embodiments, the electronic device 10 may include one or N cameras 193, where N is a positive integer greater than 1.

The digital signal processor is configured to process a digital signal and may further process another digital signal in addition to the digital image signal. For example, when the electronic device 10 selects a frequency, the digital signal processor is configured to perform Fourier transformation and the like on frequency energy.

The video codec is configured to compress or decompress a digital video. The electronic device 10 may support one or more video codecs. In this way, the electronic device 10 may play or record videos in a plurality of encoding formats, for example, moving picture experts group (MPEG)-1, MPEG-2, MPEG-3, and MPEG-4.

The NPU is a neural-network (NN) computing processor. The NPU can implement applications such as intelligent cognition of the electronic device 10, such as image recognition, facial recognition, speech recognition, and text understanding.

The external memory interface 120 may be used to connect to an external storage card, for example, a micro SD card, to extend a storage capability of the electronic device 10. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121 to perform various function applications of the electronic device 10 and process data. The internal memory 121 may include a program storage area and a data storage area. The program storage area may store an operating system, an application required by at least one function (for example, a sound playing function and an image playing function), and the like. The data storage area may store data (such as audio data and a phone book) and the like that are created during use of the electronic device 10. In addition, the internal memory 121 may include a high-speed random access memory, or may include a nonvolatile memory, for example, at least one magnetic disk storage device, a flash memory, or a universal flash storage (UFS).

The electronic device 10 may implement an audio function by using the audio module 170, the speaker 170A, the receiver 170B, the microphone 170C, the headset jack 170D, the application processor, and the like.

The audio module 170 is configured to convert digital audio information into an analog audio signal for output and is also configured to convert an analog audio input into a digital audio signal. The audio module 170 may be further configured to code and decode an audio signal.

The speaker 170A, also referred to as a "loudspeaker", is configured to convert an audio electrical signal into a sound signal. The electronic device 10 may be used to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 10, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth, to enter a sound signal to the microphone 170C. At least one microphone 170C may be disposed in the electronic device 10.

The headset jack 170D is configured to connect to a wired headset. The headset jack 170D may be the USB interface 130 or may be a 3.5 mm open mobile terminal platform (OMTP) standard interface or a cellular telecommunications industry association of the USA (CTIA) standard interface.

The pressure sensor 180A is configured to sense a pressure signal and can convert the pressure signal into an electrical signal. In some embodiments, the pressure sensor 180A may be disposed on the display 194. When a touch operation is performed on the display 194, the electronic device 10 detects intensity of the touch operation by using the pressure sensor 180A. The electronic device 10 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold acts on a thumbnail in a gallery application, an instruction for viewing a picture corresponding to the thumbnail is executed. When a touch operation whose touch operation intensity is greater than or equal to the first pressure threshold acts on a thumbnail, an instruction for selecting a picture corresponding to the thumbnail is executed.

The gyroscope sensor 180B may be configured to determine a motion posture of the electronic device 10. In some embodiments, an angular velocity of the electronic device 10 around three axes (namely, axes X, Y, and Z) may be determined by using the gyroscope sensor 180B. The gyroscope sensor 180B may be configured to perform image stabilization during photographing. The gyroscope sensor 180B may be further used in a navigation scenario and a motion-sensing gaming scenario.

The barometric pressure sensor 180C is configured to measure barometric pressure. In some embodiments, the electronic device 10 calculates an altitude based on a barometric pressure value measured by the barometric pressure sensor 180C, to assist in positioning and navigation.

The magnetic sensor 180D includes a Hall effect sensor. The electronic device 10 may detect opening and closing of a flip cover by using the magnetic sensor 180D.

The acceleration sensor 180E may detect accelerations in various directions (usually on three axes) of the electronic device 10; and may detect magnitude and a direction of gravity when the electronic device 10 is still. The acceleration sensor 180E may be further configured to identify a posture of the electronic device and applied to an application such as switching between landscape mode and portrait mode or a pedometer.

The distance sensor 180F is configured to measure a distance. The electronic device 10 may measure the distance in an infrared or a laser manner.

The optical proximity sensor 180G may include, for example, a light-emitting diode (LED) and an optical detector such as a photodiode. The light-emitting diode may be an infrared light-emitting diode. The electronic device 10 emits infrared light by using the light-emitting diode. The electronic device 10 detects infrared reflected light from a nearby object by using the photodiode. The electronic device 10 may detect, by using the optical proximity sensor 180G, that the user holds the electronic device 10 close to an ear for a call, to automatically turn off a screen for power saving.

The ambient light sensor 180L is configured to sense ambient light brightness. The electronic device 10 may adaptively adjust brightness of the display 194 based on the sensed ambient light brightness.

The fingerprint sensor 180H is configured to collect a fingerprint. The electronic device 10 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 10 executes a temperature processing policy based on the temperature detected by the temperature sensor 180J.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor, to determine a touch event type. For example, the touch event type may be a tap event, a double-tap event, a touch-and-hold event, a force touch (force touch) event, a drag event, or the like. A visual output related to the touch operation may be provided through the display 194. In some other embodiments, the touch sensor 180K may alternatively be disposed on a surface of the electronic device 10 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse and receive a blood pressure beating signal.

The button 190 includes a power button, a volume button, and the like. The button 190 may be a mechanical button or may be a touch-sensitive button. The electronic device 10 may receive a key input and generate a key signal input related to a user setting and function control of the electronic device 10.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects.

The indicator 192 may be an indicator light and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 10. The electronic device 10 may support one or N SIM card interfaces, where N is a positive integer greater than 1. The SIM card interface 195 may support a nano-SIM card, a micro-SIM card, a SIM card, and the like. In some embodiments, the electronic device 10 uses an eSIM, that is, an embedded SIM card. The eSIM card may be embedded in the electronic device 10 and cannot be separated from the electronic device 10.

Figure 2B:
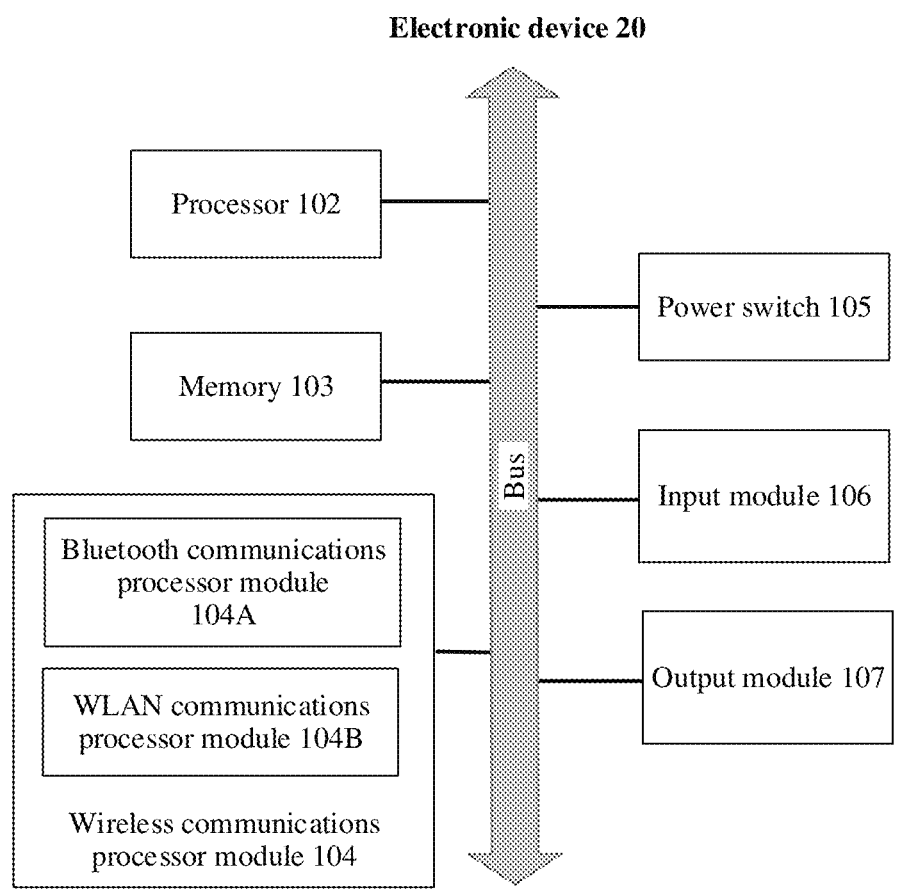
FIG. 2B is a schematic diagram of a structure of another electronic device according to an embodiment.

In the embodiments of this application, the large-screen device 200 may be an electronic device. The following describes an electronic device 20 in the embodiments of this application. FIG. 2B is a schematic diagram of a structure of the electronic device 20 according to the embodiments of this application. For example, the electronic device 20 may be a device such as a personal computer, a palmtop computer, a tablet computer, or a television. As shown in FIG. 2B, the large-screen device 200 may include a processor 102, a memory 103, a wireless communications processor module 104, a power switch 105, an input module 106, and an output module 107. These components may be connected through a bus.

The processor 102 may be configured to read and execute computer-readable instructions. In a specific implementation, the processor 102 may include a controller, an arithmetic unit, and a register. The controller is responsible for decoding an instruction and sends a control signal for an operation corresponding to the instruction. The arithmetic unit is responsible for performing a fixed-point or floating-point arithmetic operation, a shift operation, a logic operation, and the like, or may perform an address operation and address conversion. The register is responsible for saving a quantity of register operations, intermediate operation results, and the like that are temporarily stored during instruction execution. In a specific implementation, a hardware architecture of the processor 102 may be an application-specific integrated circuit (ASIC) architecture, an MIPS architecture, an ARM architecture, an NP architecture, or the like.

In some embodiments, the processor 102 may be configured to parse a signal received by the wireless communications processor module 104, for example, a projection request sent by the projection device 100, or indication information sent by the projection device 100 that indicates the large-screen device 200 to send a dragged data object. The processor 102 may be configured to perform a corresponding processing operation based on a parsing result, for example, display a prompt window based on the projection request, where the prompt window includes an "allow" control and a "reject" control, or send a data object to the projection device 100 based on the indication information.

In some embodiments, the processor 102 may be further configured to generate a signal sent out by the wireless communications processor module 104, for example, a feedback signal sent to the projection device 100 and indicating that projection is allowed, or indication information sent to the projection device 100 and indicating that a window control can receive the data object.

The memory 103 is coupled to the processor 102 and is configured to store various software programs and/or a plurality of sets of instructions. In a specific implementation, the memory 103 may include a high-speed random access memory, and may further include a nonvolatile memory, for example, one or more magnetic disk storage devices, a flash memory device, or another nonvolatile solid-state storage device. The memory 103 may store an operating system, for example, an embedded operating system such as Windows or Android. The memory 103 may further store a communication program, and the communication program may be used to communicate with the projection device 100, one or more servers, or an additional device.

The wireless communications processor module 104 may include one or more of a Bluetooth (BT) communications processor module 104A and a WLAN communications processor module 104B.

In some embodiments, the one or more of the Bluetooth (BT) communications processor module and the WLAN communications processor module may monitor a signal transmitted by another device (the projection device 100), such as the projection request or a request for transmitting the data object, and may send a response signal, for example, a request response signal, so that the another device (for example, the projection device 100) can discover the large-screen device 200; establish a wireless communication connection to the another device; and communicate with the another device by using one or more wireless communications technologies such as Bluetooth or a WLAN.

In some other embodiments, the one or more of the Bluetooth (BT) communications processor module and the WLAN communications processor module may alternatively transmit a signal, for example, a broadcast Bluetooth signal or a beacon signal, so that another device (for example, the projection device 100) can discover the large-screen device 200; establish a wireless communication connection to the another device; and communicate with the another device by using one or more wireless communications technologies such as Bluetooth or a WLAN.

The wireless communications processor module 104 may further include a cellular mobile communications processor module (not shown). The cellular mobile communications processor module may communicate with another device (for example, a server) by using a cellular mobile communications technology.

The power switch 105 may be configured to control a power supply to supply power to the large-screen device 200.

The input module 106 may be configured to receive an instruction entered by a user. For example, the input module 106 may include one or more of a mouse, a keyboard, a touchpad, a touchscreen, a microphone, and the like.

The output module 107 may be configured to output information. For example, the large-screen device 200 includes one or more displays, and the displays may be configured to display an image, a video, and the like. The display includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In addition, the output module 107 may further include one or more of a speaker, a sound box, and the like.

It may be understood that the structure shown in FIG. 2B does not constitute any limitation on the large-screen device 200. In some other embodiments of this application, the large-screen device 200 may include more or fewer components than those shown in the figure, or some components may be combined, or some components may be split, or different component arrangements may be used. The components shown in the figure may be implemented by hardware, software, or a combination of software and hardware.

In the embodiments of this application, a software system of the projection device 100 and the large-screen device 200 may use a layered architecture, an event-driven architecture, a micro kernel architecture, a micro service architecture, or a cloud architecture. In the embodiments of this application, an Android system with a layered architecture is used as an example to describe a software structure of the projection device 100. A Windows system is used as an example to describe a software structure of the large-screen device 200.

Figure 2C:
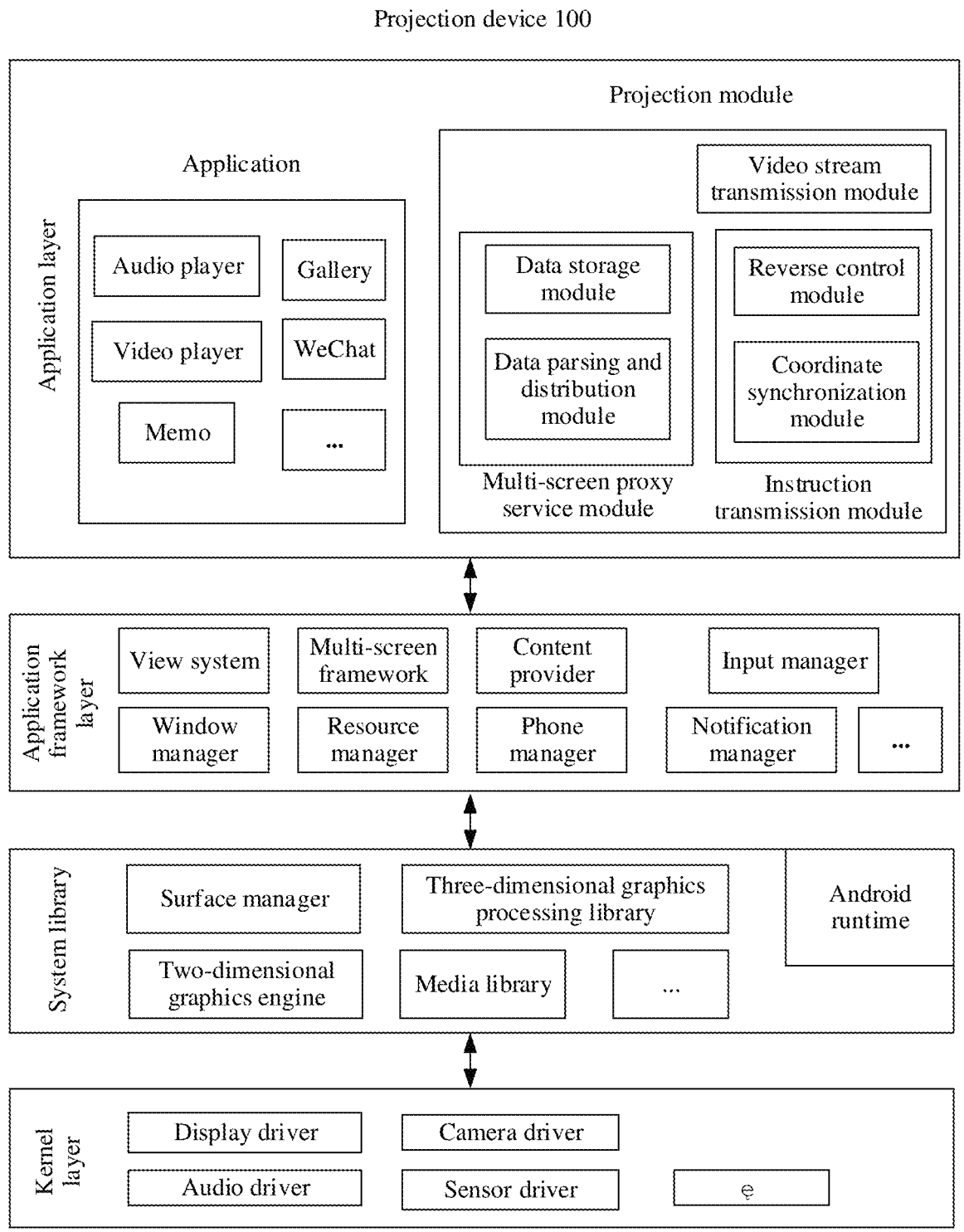
FIG. 2C is a block diagram of a software structure of a projection device 100 according to an embodiment.

FIG. 2C is a block diagram of a software structure of the projection device 100 according to the embodiments of this application.

In the layered architecture, software is divided into several layers, and each layer has a clear role and task. The layers communicate with each other through a software interface. In some embodiments, the Android system is divided into four layers, that is, an application layer, an application framework layer, an Android runtime (Android runtime) and system library, and a kernel layer from top to bottom.

The application layer may include one or more applications and projection modules.

FIG. 2C shows applications such as Video player, WeChat, Gallery, and Audio player as an example. In addition, the application layer may further include another application such as Camera, Calendar, Phone, Map, Navigation, and Messages.

The projection module may be a service or a function provided by the projection device 100. The projection module may provide the projection device 100 with a function of performing data transmission with the large-screen device 200 in a projection scenario, so as to implement projection. The projection module may include a video stream transmission module, an instruction transmission module, and a multi-screen proxy service module.

The video stream transmission module may be configured to: obtain display content on the display of the projection device 100 and send the display content to the large-screen device 200 for display.

The instruction transmission module may include a coordinate synchronization module and a reverse control module. The reverse control module may receive an input instruction sent by the large-screen device 200. The input instruction may include a "MotionEvent. ACTION_DOWN (press)" instruction, a "MotionEvent. ACTION_UP (lift)" instruction, and a "MotionEvent. ACTION_MOVE (move)" instruction, and the like. The coordinate synchronization module may receive coordinate information corresponding to the input instruction sent by the large-screen device 200. The coordinate information is coordinate information about the input instruction relative to the display content of the projection device 100 displayed on the display of the large-screen device 200.

The multi-screen proxy service module may include a data storage module and a data parsing and distribution module. The data parsing and distribution module may be configured to parse data (a digital bit stream) received from the large-screen device 200 into data (for example, a picture, a video, and audio) that can be read by an application of the projection device 100. The data storage module may be configured to store data received from the large-screen device 200 and generate a storage path corresponding to the data. The data parsing and distribution module may be further configured to send, to the large-screen device 200, data in the projection device 100 that needs to be transmitted. The data received and sent by the multi-screen proxy service module is data that needs to be transmitted in an application selected by the user, for example, a picture in Gallery, a word document in "This PC", or an attachment in Mailbox.

The application framework layer provides an application programming interface (API) and a programming framework for an application at the application layer. The application framework layer includes some predefined functions.

As shown in FIG. 2C, the application framework layer may include a multi-screen framework, a window manager, a content provider, a view system, a phone manager, an input manager, a notification manager, and the like.

The input manager may receive an input instruction and coordinate information about the input instruction that are sent by the instruction transmission module, and determine an input event based on the information, so as to perform a corresponding operation. For example, the input event may be a tap event, a double-tap event, a touch-and-hold event, a force touch (force touch) event, a drag event, or the like. For example, if the input manager receives the "Motion-Event. ACTION_DOWN" "MotionEvent. ACTION_UP" instruction sent by the instruction transmission module, the input manager may determine that the tap event is received.

The window manager may be configured to manage a window program. The window manager may obtain a size of a display, determine whether there is a status bar, perform screen locking, take a screenshot, and the like. In the embodiments of this application, the window manager may determine, based on the coordinate information sent by the input manager, an application interface corresponding to the coordinate information in current display content of the projection device.

The view system may include a visual window control, such as a control for displaying a text or a control for displaying a picture. The view system may be configured to construct an application. A display interface may include one or more controls. For example, a display interface including a notification icon of Messages may include a text display view and a picture display view. In the embodiments of this application, the view system may determine, based on the information about the application interface and the coordinate information that are sent by the window manager, a window control corresponding to the coordinate information. Coordinate information about each window control in each display interface of the projection device 100 is pre-stored in the view system.

The multi-screen framework may receive file information (for example, a name, a creation/modification date, a format, a size, or a thumbnail) and a storage path of a file object that needs to be transferred and that is sent by an application. In some other implementations, the multi-screen framework may further receive a preset condition that is sent by the application and that is of a file object that can be received by a control. The multi-screen framework may further determine, based on the preset condition and the information about the file object sent by the large-screen device, whether the control can receive the file object.

The content provider may be configured to store and obtain data and enable the data to be accessed by an application. The data may include a video, an image, audio, calls that are made and received, a browsing history and bookmarks, a phone book, and the like. The multi-screen proxy service module may obtain the data of the file object from the content provider based on the storage path of the file object.

The phone manager may be configured to provide a communication function of the electronic device 100, for example, management of a call status (including answering, declining, or the like).

The notification manager may enable the application to display notification information in the status bar, may be configured to convey a notification message, and may automatically disappear after a short pause without user interaction. Alternatively, the notification manager may display a notification in a top status bar of the system in a form of a graph or a scroll bar text or may display a notification on a screen in a form of a dialog window.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run in the virtual machine. The virtual machine executes java files at the application layer and the application framework layer as binary files. The virtual machine is configured to perform functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager may be configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats such as MPEG-4, G.264, MP3, AAC, AMR, JPG, and PNG.

The three-dimensional graphics processing library may be configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The software system shown in FIG. 2C relates to application presentation (such as Gallery and WeChat) using a data transmission capability, and the projection module providing a projection capability and a data transmission capability. The application framework layer provides the multi-screen framework, a WLAN service, and a Bluetooth service, and the kernel and bottom layers provide a WLAN and Bluetooth capability, and a basic communication protocol. It should be noted that the software architecture of the electronic device shown in FIG. 2C is merely an implementation of the embodiments of this application. In actual application, the electronic device may alternatively include more or fewer software modules. This is not limited herein.

In the embodiments of this application, based on the software structure shown in FIG. 2C, the projection device 100 may further include a display module. The display module is configured to display a corresponding user interface based on running of each software module. For a user interface displayed by the display module, refer to user interfaces shown in FIG. 3A to FIG. 3C. The display module may be implemented as the display 194 in FIG. 2A.

Figure 2D:
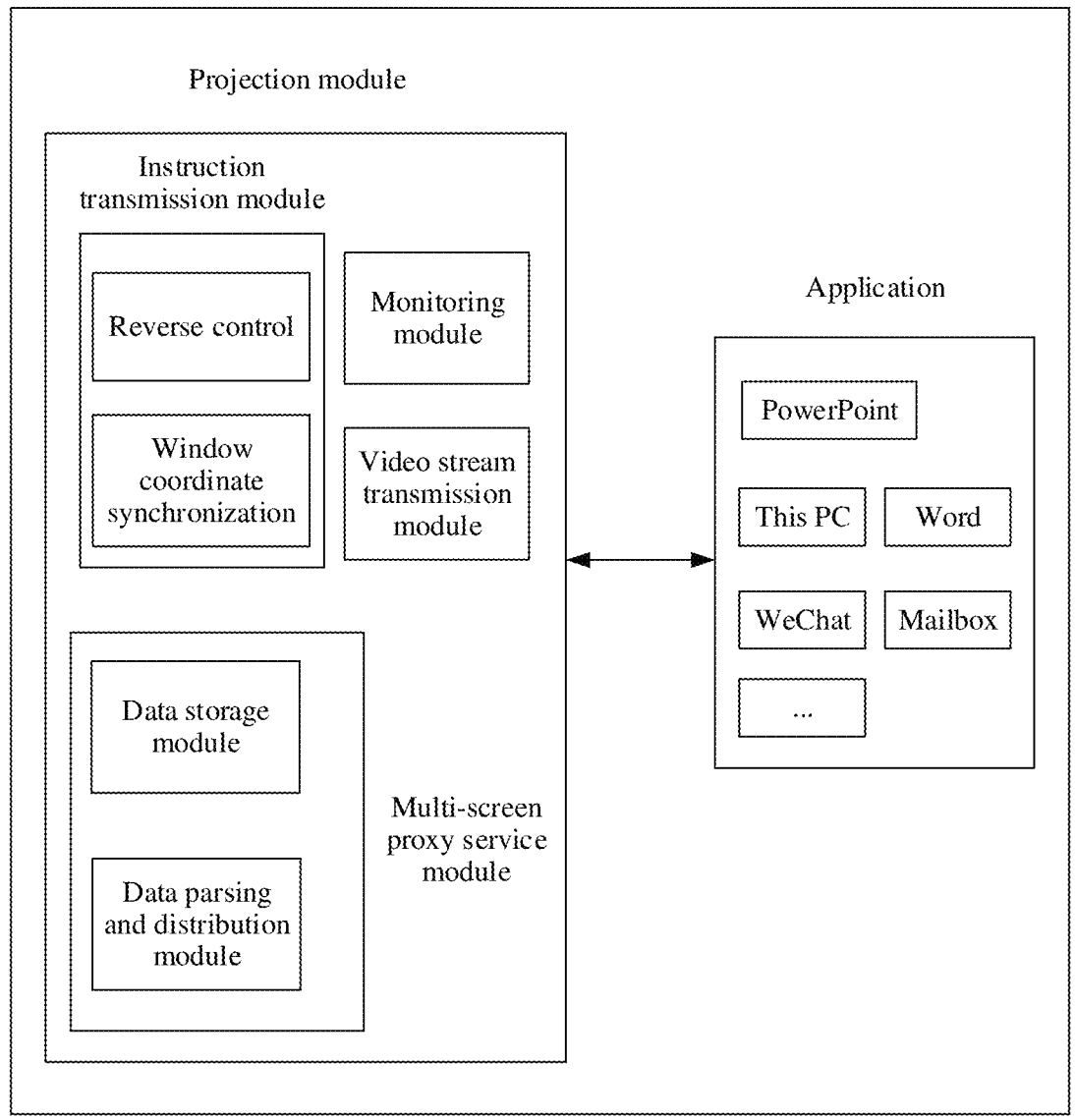
FIG. 2D is a block diagram of a software structure of a large-screen device 200 according to an embodiment.

FIG. 2D is a block diagram of a software structure of a large-screen device 200 according to the embodiments of this application. In a projection scenario in which the projection device 100 projects a display interface to the large-screen device 200, the large-screen device 200 may enable a "multi-screen proxy service" to implement a data sharing method provided in the embodiments of this application.

As shown in FIG. 2D, the large-screen device 200 may include one or more applications and a projection module.

FIG. 2D shows applications such as PowerPoint, This PC, and Word as an example. In addition, the application may be another application such as Google Chrome, Music, Computer manager, Email, or App store.

The projection module may be a service or a function provided by the large-screen device 200. The projection module may provide a projection function for the projection device 100 and provide a function of performing data transmission with the projection device 100 for the large-screen device 200 in the projection scenario. The projection module may include a video stream transmission module, a monitoring module, an instruction transmission module, and a multi-screen proxy service module.

The video stream transmission module may be configured to: receive display content that is sent by the projection device 100 and that is in the display of the projection device 100, and display the display content on the display, to implement a projection function.

The monitoring module may be configured to monitor a user operation received on the display of the large-screen device 200. The coordinate information is coordinate information about an original input instruction relative to the display of the large-screen device 200. The monitoring module is further configured to: when it is determined that the operation is performed on the display content of the projection device 100 displayed on the display of the large-screen device 200, send the original input instruction and the coordinate information to the instruction transmission module for conversion. When it is determined that the operation is performed on the display content of the large-screen device 200 displayed on the display of the large-screen device 200, the original input instruction and the coordinate information are sent to a processor of the large-screen device 200, so as to determine an input event corresponding to the operation. For example, the input event may be a tap event, a double-tap event, a touch-and-hold event, a force touch (force touch) event, a drag event, or the like.

The instruction transmission module may include a coordinate synchronization module and a reverse control module. The coordinate synchronization module may convert coordinate information in the received original input instruction into coordinate information relative to the display content of the projection device 100. The reverse control module may be configured to convert an original input instruction received by a laptop into an input instruction that can be recognized by a smartphone, for example, convert a "move up" instruction into a "MotionEvent. ACTION_UP" instruction, convert a "move down" instruction into a "MotionEvent. ACTION_DOWN" instruction and convert a "move" instruction into a "MotionEvent. ACTION_MOVE" instruction. The reverse control module is further configured to send the converted input instruction and the converted coordinate information to the projection device 100.

The multi-screen proxy service module may include a data storage module and a data parsing and distribution module. The data parsing and distribution module may be configured to parse data (a digital bit stream) received from the projection device 100 into data (for example, a picture, a video, and audio) that can be read by an application of the large-screen device 200. The data storage module may be configured to store data received from the projection device 100 and generate a storage path corresponding to the data. The data parsing and distribution module may be further configured to copy data in the large-screen device 200 that needs to be transmitted and send the data to the projection device 100. The data received and sent by the multi-screen proxy service module is data that needs to be transmitted in an application selected by the user, for example, a picture in Gallery, a word document in "This PC", or an attachment in Mailbox.

The software system shown in FIG. 2D relates to application presentation (such as This PC and Word) using a data transmission capability, and the projection module providing a projection function and a data transmission function. It should be noted that the software architecture of the electronic device shown in FIG. 2D is merely an implementation of the embodiments of this application. In actual application, the electronic device may alternatively include more or fewer software modules. This is not limited herein.

In the embodiments of this application, the large-screen device 200 may further include a display module. The display module is configured to display a corresponding user interface based on running of each software module. For a user interface displayed by the display module, refer to user interfaces shown in FIG. 1B, FIG. 4A, FIG. 4C to FIG. 4E, FIG. 5A to FIG. 5D, and FIG. 6A to FIG. 6C. The display module may be implemented as the output module 107 in FIG. 2B.

The following describes a data transmission process provided in the embodiments of this application with reference to an interface diagram. First, several manners of enabling "projection" on the projection device 100 provided in the embodiments of this application are described.

Figure 3A:
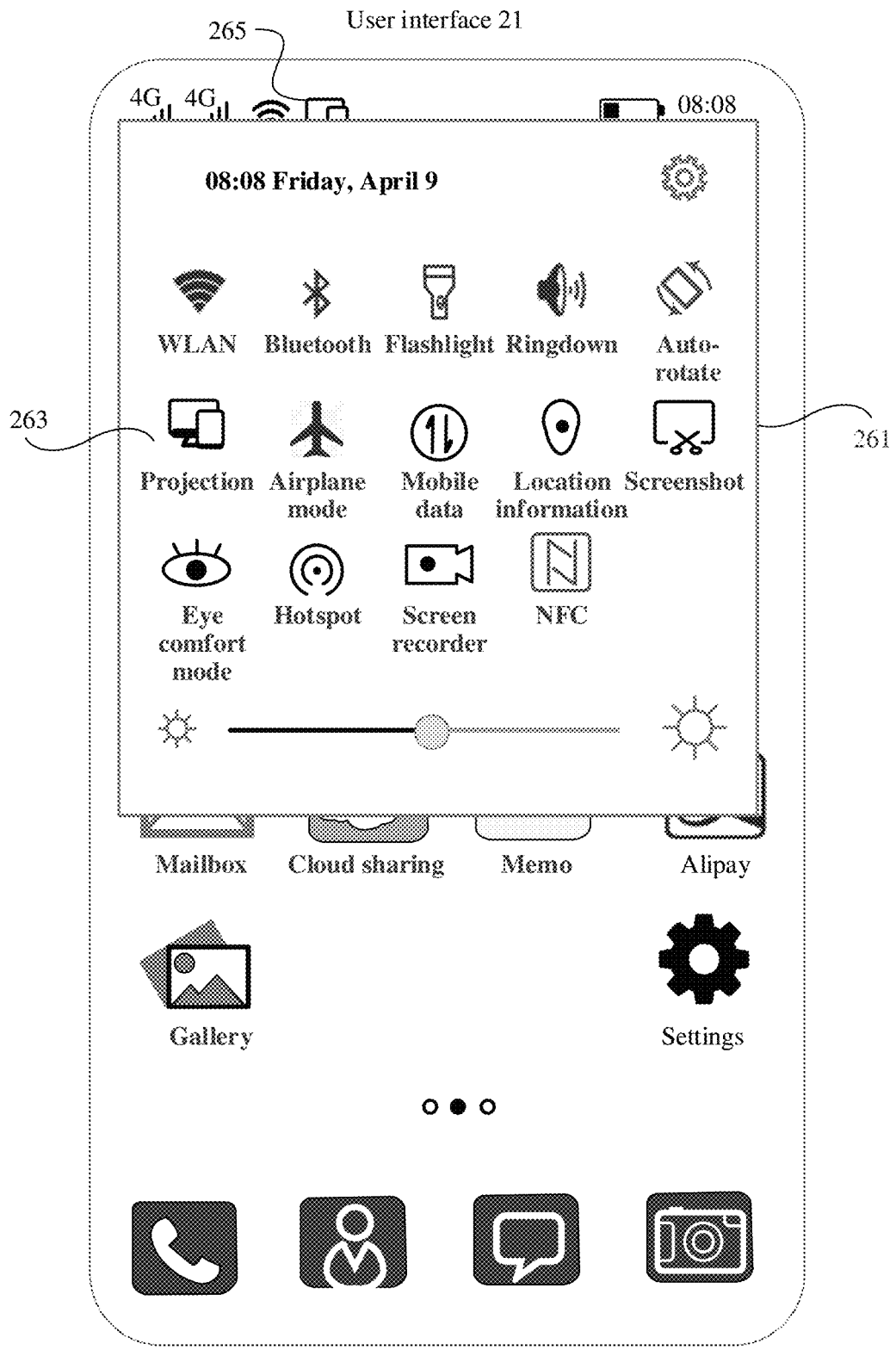
FIG. 3A is a schematic diagram of an operation of enabling a "projection" function on a projection device 100 according to an embodiment.
Figure 3B:
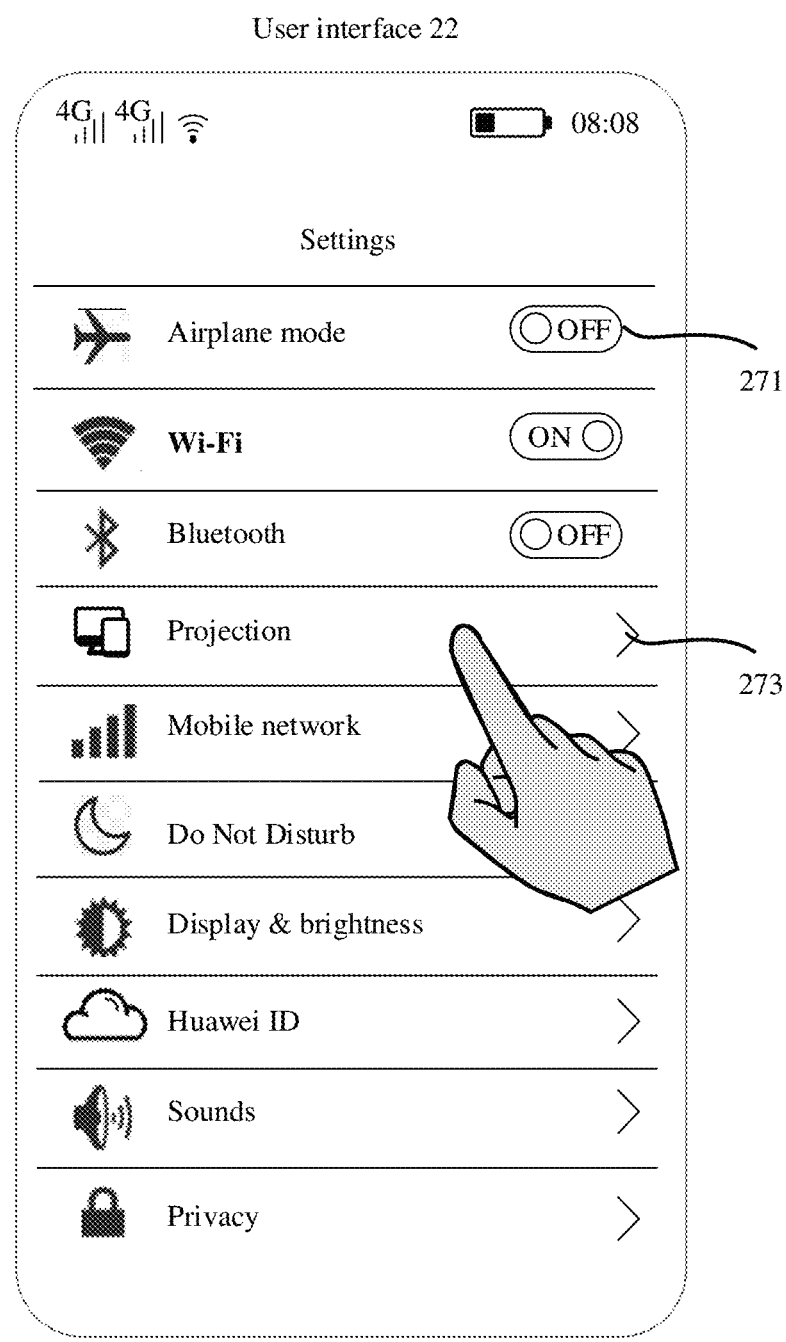
FIG. 3B is a schematic diagram of another operation of enabling a "projection" function on a projection device 100 according to an embodiment.

FIG. 3A shows an operation of enabling a "projection" function on the projection device 100 as an example. As shown in FIG. 3A, when detecting a user operation of swiping downward on a status bar 201, the projection device 100 may display a window 261 on a user interface 21 in response to the user operation. The window 261 may display a switch control 263 of "projection" and may further display switch controls of other functions (for example, Wi-Fi, Bluetooth, and Flashlight). When detecting a user operation (for example, a touch operation on the switch control 263) acting on the switch control 263 on the window 261, the projection device 100 may enable "projection" in response to the user operation.

Optionally, when "projection" is in an enabled state, the projection device 100 may display an identifier 265 in the status bar 201. The identifier 265 is used to indicate that "projection" is enabled. In addition, after the user disables "projection", the projection device 100 no longer displays the identifier 265.

Not limited to enabling "projection" in the window 261, the user may further enable "projection" in a settings interface. For this manner, refer to the embodiment shown in FIG. 3B.

Figure 3C:
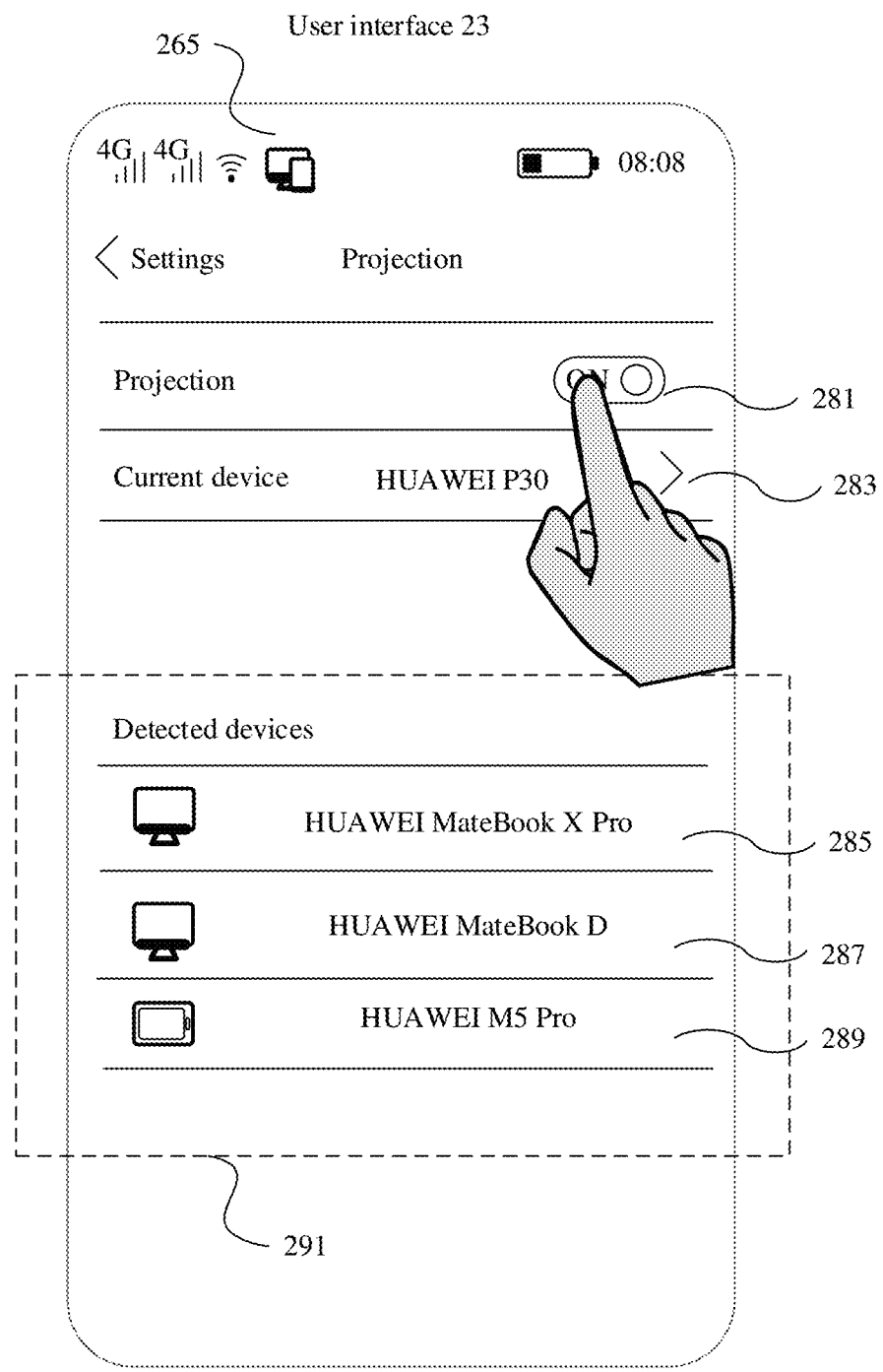
FIG. 3C is a schematic diagram of a user interface for displaying a "projection" settings option on a projection device 100 according to an embodiment.

FIG. 3C shows a user interface 23 for displaying a "projection" settings option on the projection device 100 according to the embodiments of this application. The user interface 23 includes a switch control 281, a details control 283, and a display area 291. When the user taps the switch control 281, in response to the tapping, the projection device 100 enables "projection", and switches the switch control 281 from displaying an "OFF" state to displaying an "ON" state. Optionally, the projection device 100 may further display a prohibitive sign 265 in the status bar 201.

In addition, in response to the user operation, the projection device 100 also detects laptops around the projection device 100 that can receive projection and displays information about these laptops in the display area 291.

When the user taps the details control 283, in response to the tap operation, the projection device 100 switches from displaying the user interface 23 to displaying a user interface that includes related information about a current device HUAWEI P30.

The display area 291 may be configured to display information about one or more laptops that can receive projection. For example, the display area 291 includes a control 285, a control 287, and a control 289. One control corresponds to one laptop, and different controls correspond to different laptops. For example, the control 285 corresponds to a laptop HUAWEI MateBook X Pro (a name of a laptop). When the user taps the control 285, in response to the tap operation, the projection device 100 sends a projection request to the laptop HUAWEI MateBook X Pro. Then, in response to feedback of the laptop HUAWEI MateBook X Pro for connection permission of the projection request, the projection device 100 establishes a connection relationship with the laptop HUAWEI MateBook X Pro. It should be noted that, for a function of another control, refer to a function of the control 285. Details are not described herein again.

It should be noted that the laptop may implement the data transmission method in the embodiments of this application by enabling "projection". "Projection" may be an application in the laptop, and "projection" may alternatively be a service provided in an application in the laptop. For example, the application may be "Computer manager", and may alternatively be another application. This is not limited in this embodiment of this application. After enabling "projection", the laptop may receive, by using the wireless communications processor module 104, the projection request sent by the projection device 100. Optionally, after receiving the projection request, the laptop may display a prompt window. The prompt window includes an "allow" control and a "reject" control. If an operation performed by the user on the "allow" control is detected, the laptop sends a connection permission response to the projection device, and the large-screen device 200 establishes a connection to the projection device 100.

After the projection device 100 establishes the connection relationship with the laptop HUAWEI MateBook X Pro, the video stream transmission module in the projection module of the projection device 100 sends recorded display content to the laptop. The laptop receives the recorded display content and displays the display content on the display. For a display interface on the laptop, refer to the user interface 41 shown in FIG. 1B.

Next, based on the projection system 10, the electronic device 10, and the electronic device 20 described in the foregoing content, the data transmission method provided in the embodiments of this application is described in detail with reference to other accompanying drawings. It should be noted that, in the following embodiments, an example in which the projection device 100 is a smartphone and the large-screen device 200 is a laptop is used for description. The projection device 100 and the large-screen device 200 may alternatively be another electronic device. For example, the projection device 100 may be a laptop, and the large-screen device 200 may be a television, a projector, or the like. This is not limited in the embodiments of this application.

The data transmission manners shown in the embodiments of this application may be classified into two cases. A first case is that data is transmitted from an application on the smartphone to an application on the laptop. A second case is that data is transmitted from an application on the laptop to an application on the smartphone. The following separately describes the two cases, and first describes the first case.

Projection scenario 1: A display of the smartphone displays a user interface of "Gallery". Display content of the smartphone is projected to a display of the laptop for display. The display of the laptop simultaneously displays the display content of the smartphone and an editing interface of Microsoft Office Word (referred to as Word for short below) on the laptop. "Gallery" is an image management application on the smartphone and may also be referred to as "Album", "Photo", or the like. A name thereof is not limited in this application. "Word" is a word processing application on the laptop.

Figure 4A:
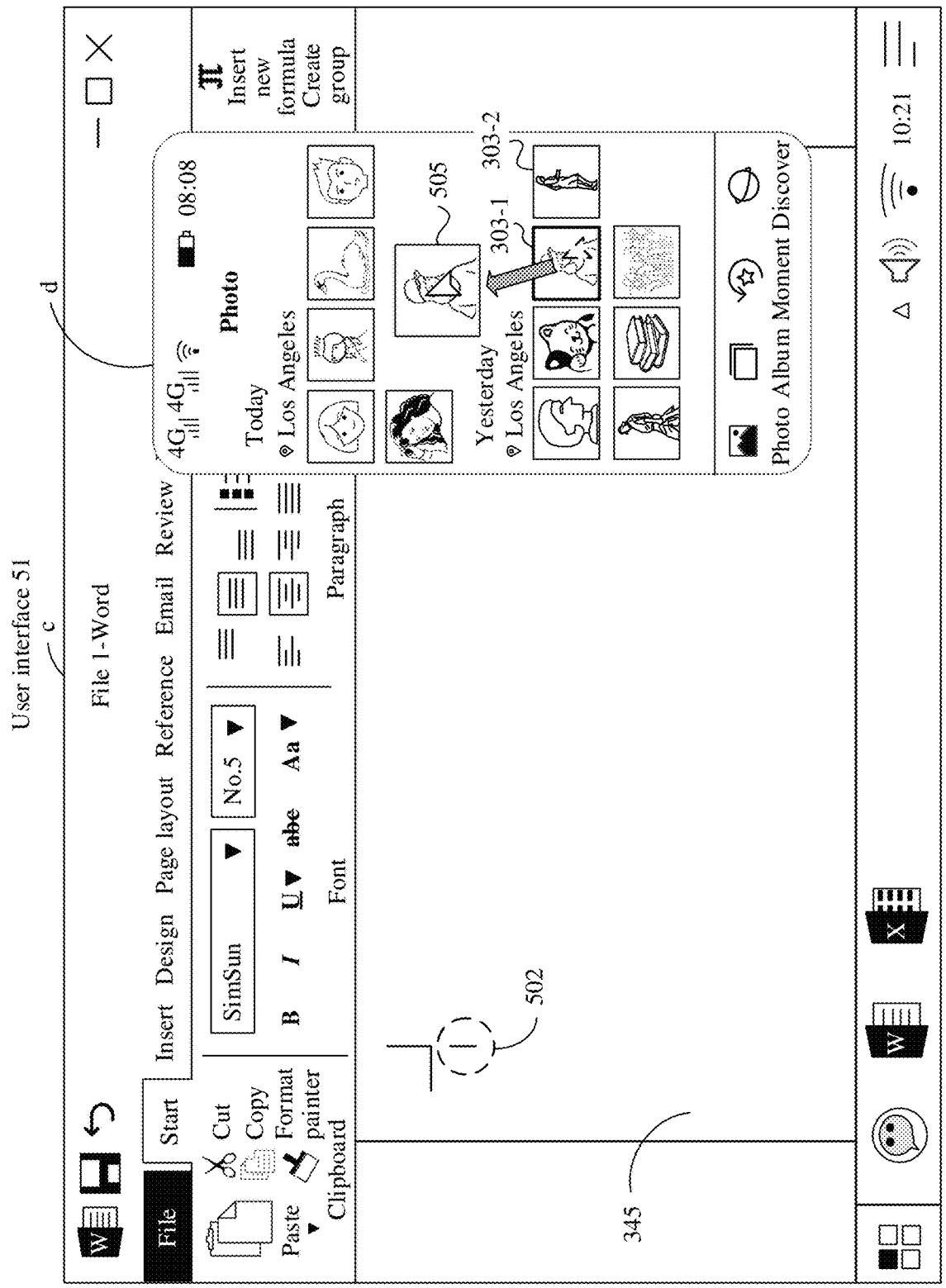
FIG. 4A is a schematic diagram of a user interface of projecting a screen of a smartphone to a laptop according to an embodiment.

FIG. 4A is a schematic diagram of a user interface 51 of projecting a screen of the smartphone to the laptop according to the embodiments of this application. The user interface 51 includes a window c, a window d, and a status bar 310. The window c is used to display an editing interface of a Word application on the laptop, and the window d is used to display an interface of the Gallery application on the smartphone. For example, the interface of the Gallery application includes a navigation bar and a plurality of file objects. For example, the file object may be a thumbnail 303-1, a thumbnail 303-2, or the like. The editing interface of the Word application includes a title bar, a menu bar, a toolbar, and a document editing area 345. The document editing area 345 is used to receive and display information entered by a user. The document editing area 345 includes a cursor 502, and the cursor 502 is used to indicate a display position of information to be entered by the user. It should be noted that, in the editing interface of the Word application, the document editing area 345 may receive a transferred file object and display the transferred file object at a position indicated by the cursor 502. For example, whether each control on the editing interface of the Word application can receive a file object may be determined during user interface design of the Word application.

Figure 4B:
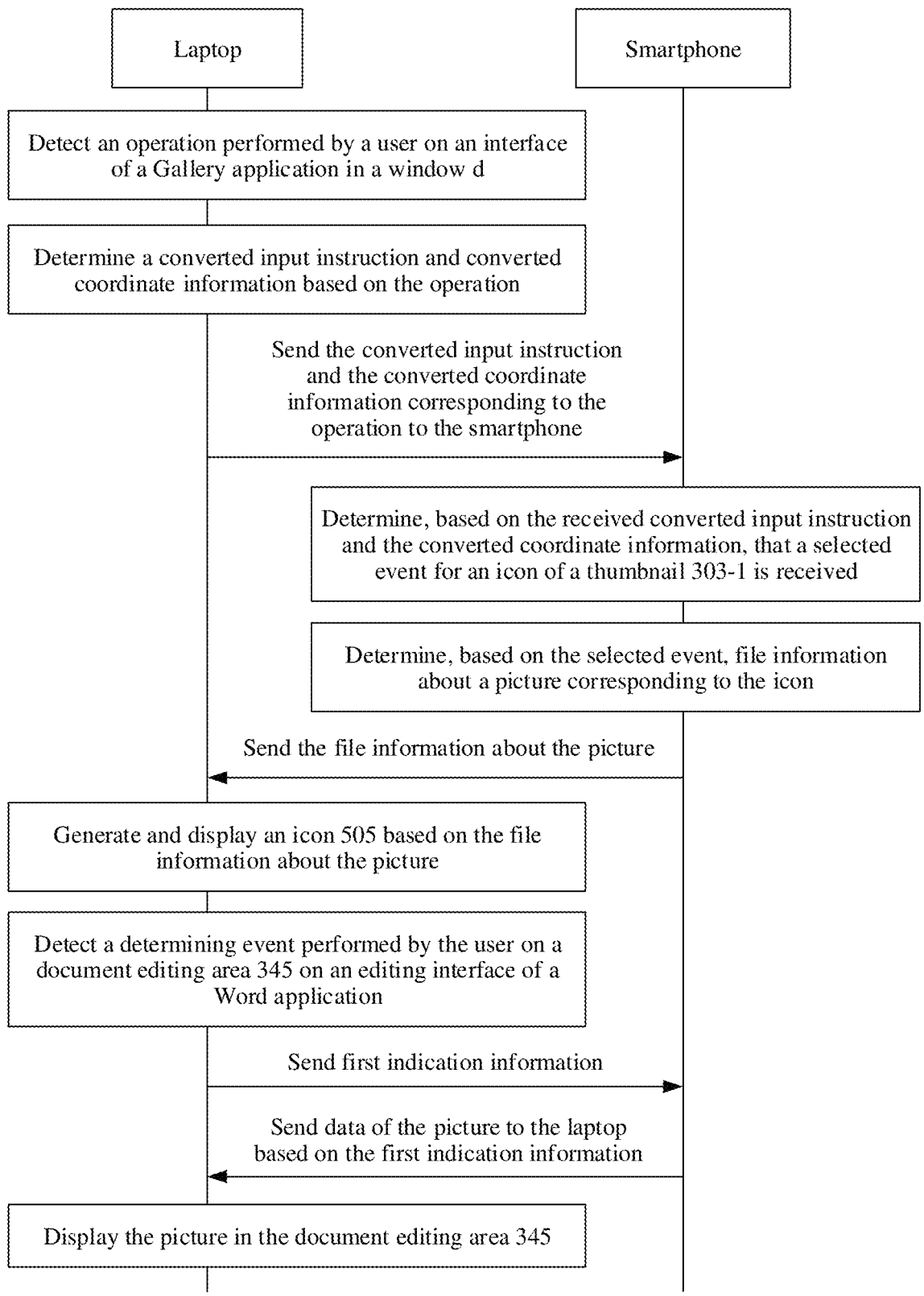
FIG. 4B is a flowchart of a data transmission method according to an embodiment.

A projection scenario shown in FIG. 4A is used as an example below to describe a process of transmitting data from the Gallery application on the smartphone to the Word application on the laptop. For the process, refer to a method flowchart shown in FIG. 4B. The method includes the following steps.

S101: When detecting an operation performed by the user on the interface of the Gallery application in the window d, the laptop sends, to the smartphone, a converted input instruction and converted coordinate information that are corresponding to the operation.

For example, the operation performed by the user on the interface of the Gallery application in the window d is an operation of touching and holding the thumbnail 303-1 by the user.

For example, in the projection scenario, a monitoring module in a projection module of the laptop may continuously monitor an operation received on the display and determine an original input instruction and coordinate information that are corresponding to the operation. The monitoring module may determine, based on coordinate information about the original input instruction and a coordinate area of the interface of the Gallery application, that the operation is performed on the interface of the Gallery application. For example, the original input instruction may include instructions such as "move up (lift)", "move down (press)", and "move (move)".

After detecting that the operation entered by the user acts on the interface of the Gallery application, the monitoring module sends the original input instruction and the coordinate information to an instruction transmission module. The instruction transmission module converts the coordinate information into coordinate information relative to display content (that is, the interface of the Gallery application) of the projection device 100, converts the original input instruction into an input instruction that can be recognized by the smartphone, and sends the converted input instruction and the converted coordinate information to the smartphone.

S102: When the smartphone determines, based on the received converted input instruction and the converted coordinate information, that a selected event for an icon of the thumbnail 303-1 is received, the smartphone determines file information about a picture corresponding to the icon.

The selected event may be a tap event, a double-tap event, a touch-and-hold event, a force touch (force touch) event, a drag event, or the like. The selected event in the embodiments is described by using a touch-and-hold event. The file information may include information about a name, a creation/modification date, a format, a size, the icon, or the like of the picture. The selected event is used to select a file object to be transferred.

An implementation process of step S102 may include the following steps:

S1: The instruction transmission module of the smartphone sends the converted input instruction and the converted coordinate information to an input manager.

S2: After the input manager receives the converted input instruction and the converted coordinate information, the input manager determines, based on the converted input instruction, that the touch-and-hold event is received. For example, the input instruction may be "MotionEvent. ACTION_DOWN", "MotionEvent. ACTION_DOWN", and "MotionEvent. ACTION_DOWN", and the input manager determines that the touch-and-hold event is received.

S3: The input manager sends the touch-and-hold event and coordinate information corresponding to the touch-and-hold event to a window manager.

The coordinate information corresponding to the touch-and-hold event is the converted coordinate information.

S4: After the window manager receives the touch-and-hold event and the coordinate information corresponding to the touch-and-hold event, the window manager determines, based on the coordinate information, that an application interface displayed in a display area corresponding to the touch-and-hold event is an application interface of Gallery.

It should be noted that a display area exists on the smartphone shown in FIG. 4A, and the display area is used to display the application interface of Gallery. When the smartphone is in a split-screen state, there may be two display areas on the smartphone. The window manager may determine, based on the coordinate information, that the display area corresponding to the touch-and-hold event is one of the two display areas, and determine the application interface displayed in the display area.

S5: The window manager sends information about the application interface, the touch-and-hold event, and the coordinate information corresponding to the touch-and-hold event to a view system.

S6: After the view system receives the information about the application interface, the touch-and-hold event, and the coordinate information corresponding to the touch-and-hold event, the view system may determine, based on the information about the application interface and the coordinate information corresponding to the touch-and-hold event, that a control corresponding to the touch-and-hold event is the icon of the thumbnail 303-1.

S7: The view system sends the touch-and-hold event for the icon of the thumbnail 303-1 to the Gallery application.

S8: After the Gallery application receives the touch-and-hold event that is sent by the view system for the icon of the thumbnail 303-1, in response to the touch-and-hold event, the Gallery application sends, to a multi-screen framework, the file information about the picture corresponding to the icon of the thumbnail 303-1. The file information about the picture may include one or more of the name, the creation date, the format, the size, the icon, or the like of the picture. A type of file information that needs to be sent may be set in advance. A file format of the picture corresponding to the thumbnail 303-1 may be JPEG. It should be noted that formats of different file objects may be different. For example, a format of a file object may alternatively be a graphics interchange format (GIF), a text file TXT, a Microsoft Powerpoint presentation PPT, a portable document format (PDF), a joint photographic experts group (JPEG) format, an audio video interleaved (AVI) format, or the like.

In a possible implementation, in response to the touch-and-hold event, the Gallery application may display, on the interface of the Gallery application through the view system, that the icon of the thumbnail 303-1 is selected. For example, that the icon of the thumbnail 303-1 is selected may be displayed by displaying a highlighted box around the icon of the thumbnail 303-1, displaying an identifier (for example, "√") on the icon of the thumbnail 303-1, or changing a display color of the icon of the thumbnail 303-1. In addition, as content displayed on the display of the smartphone changes, content displayed in the window d also changes accordingly.

In another possible implementation, with reference to the method described in S1 to S8 in the foregoing content, a user operation that is detected on the laptop and that acts on the interface of the Gallery application is synchronized to the smartphone for response. In response to an operation of the user dragging the icon of the thumbnail 303-1 in the window d, the view system of the smartphone sends, to the Gallery application, a determined drag event for the icon of the thumbnail 303-1. The Gallery application displays, on the interface of the Gallery application through the view system, a file icon shown as an example of an icon 505. The file icon is used to indicate a drag position of the picture, and a display position of the file icon changes with movement of the mouse pointer 311.

S9: After receiving the file information about the picture sent by the Gallery application, the multi-screen framework sends the file information about the picture to the projection module.

S103: The smartphone sends the file information about the picture to the laptop through the projection module.

S104: The laptop generates and displays the icon 505 based on the file information about the picture.

Figure 4C:
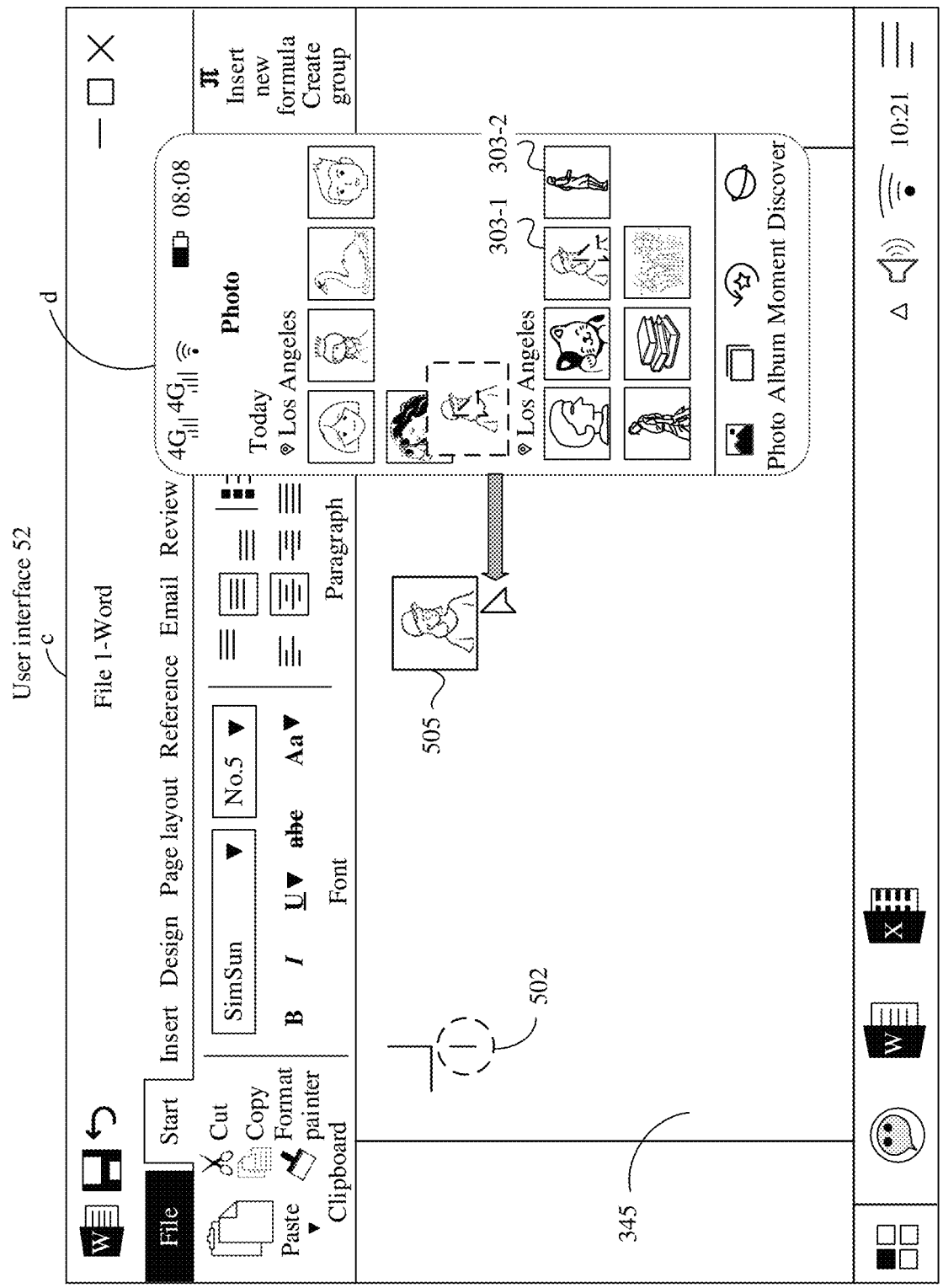
FIG. 4C is a schematic diagram of a user interface for displaying an icon according to an embodiment.

For such a display manner, refer to FIG. 4C. The icon 505 is used to indicate a drag position of the picture, and a display position of the icon 505 changes with movement of the mouse pointer 311. The laptop may generate the icon 505 based on icon information in the file information about the picture. Optionally, the laptop may generate the icon 505 based on the file format in the file information. Drag objects with a same format type display a same icon. It should be noted that one format type may include a plurality of different file formats. For example, a picture type may include GIF, JPEG, portable network graphics (PNG), and the like, and a video type may include motion picture experts group (MPEG), AVI, moving picture experts group 4 (MP4), and the like.

In another possible implementation, when a user drag operation acts on the window d, the smartphone generates and displays the file icon. When detecting that the user drags the icon of the thumbnail 303-1 from the window d to the window c, the laptop generates and displays the icon 505 based on the file information about the picture. The file icon on the display of the smartphone may be different from the icon 505 generated by the laptop. S105: When detecting a determining event performed by the user on the document editing area 345 on the editing interface of the Word application, the laptop sends first indication information to the smartphone, where the first indication information is used to indicate the smartphone to send the picture to the laptop.

The determining event may be a tap event, a double-tap event, a touch-and-hold event, a force touch event, a drag event, or the like. For example, the determining event may be a drag event of a lift drag operation that acts on the document editing area 345 on the editing interface of the Word application. The determining event may be used to determine a control of an application that receives the file object.

S106: After the smartphone receives the first indication information, the smartphone sends the picture to the laptop based on the first indication information.

The picture sent by the smartphone to the laptop includes data of the picture and the file information about the picture.

Before the smartphone sends the picture to the laptop, the smartphone needs to determine a storage path of the picture. A manner in which the smartphone determines the storage path of the picture may be as follows: In step S8, when sending the file information about the picture to the multi-screen framework, the Gallery application sends the storage path of the picture to the multi-screen framework. The multi-screen framework then sends the storage path of the picture to a multi-screen proxy service module. Optionally, a manner of determining the storage path of the picture may further be: After the smartphone receives the first indication information, the multi-screen proxy service module sends, to the multi-screen framework, an instruction for obtaining the storage path of the picture, and in response to the instruction, the multi-screen framework obtains the storage path of the picture from the Gallery application and feeds back the storage path to the multi-screen proxy service module. For example, a process in which the smartphone sends the data of the picture to the laptop may be as follows: The multi-screen proxy service module of the projection module in the smartphone invokes an interface of an application framework layer based on the storage path of the picture, copies the data of the picture from a content provider, and sends the data of the picture to the laptop.

S107: After the laptop receives the data of the picture, the laptop displays the picture in the file editing area 345.

Figure 4D:
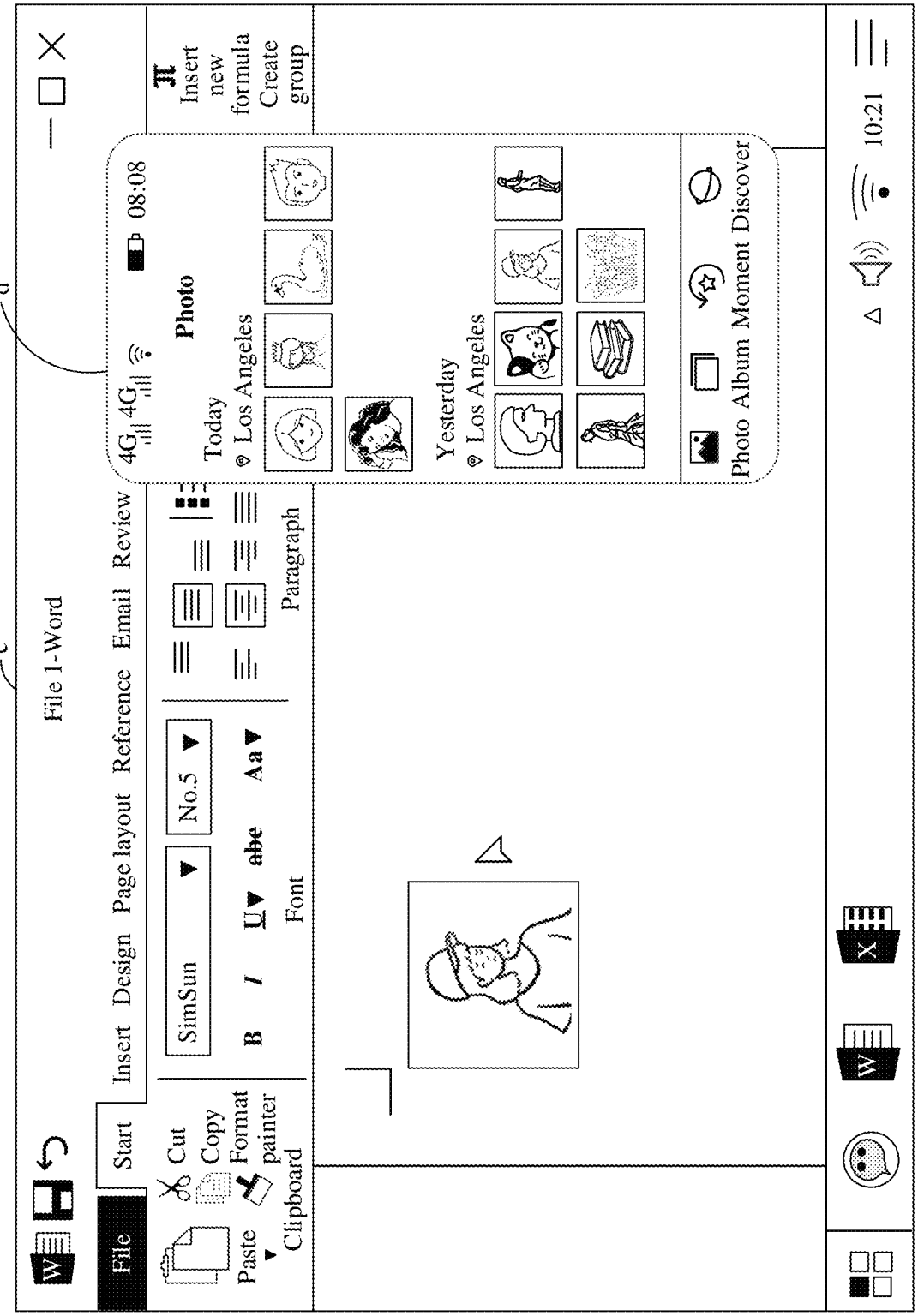
FIG. 4D is a schematic diagram of a user interface for displaying a picture in a file editing area according to an embodiment.

For such a display manner, refer to a user interface 53 shown in FIG. 4D. For example, for a specific implementation process of step S107, refer to the following steps:

S11: The multi-screen proxy service module in the laptop parses, by using a content parsing and distribution module, received data (a data bit stream) into a picture (which can also be other data, for example, a video, audio, or a document) that can be read by the application on the laptop, stores the parsed data in a content storage module, and generates a storage path of the data of the picture.

S12: The multi-screen proxy service module in the laptop sends the storage path of the data of the picture to the Word application.

S13: The Word application in the laptop processes the data of the picture based on a program corresponding to the file editing area 345.

For example, the Word application reads the picture from the storage path and displays the picture in the file editing area 345. In another example, if a transferred file is a word document, the Word application displays an icon of the word document at the cursor 502 in the document editing area 345, and the user may open the word document by tapping the icon of the document.

In a possible implementation, the Word application displays the picture at the cursor 502 in the file editing area 345. A position of the cursor 502 is the display position of the cursor 502 before receiving the determining event. In another possible implementation, in step S12, the multi-screen proxy module may further send coordinates corresponding to the determining event to the Word application. The Word application displays the picture at the coordinates corresponding to the determining event. Optionally, the Word application moves the position of the cursor 502 to the rear of the picture.

In addition, the Word application stores the picture in a cache space corresponding to a file 1. Further, after the user taps a save control on a word editing interface, the Word application stores the picture in a storage space corresponding to the file 1 as a picture in the file 1. In still another possible case, after the document editing area 345 receives the picture, if the user closes the file 1 and does not save modification of the file 1, the Word application does not store the picture, and clears the picture from the cache space. It should be noted that a manner in which the Word application processes transmitted file data may be determined during program design of the Word application. In this manner, the user can conveniently transfer a picture in the Gallery application on the smartphone to the Word application on the laptop. This improves data sharing efficiency.

In some other embodiments, when detecting that the user drags the icon 336-1 from the window d to the window c, the laptop sends the first indication information to the smartphone. Then, the laptop receives the data of the picture sent by the smartphone. When detecting a lift operation of a drag operation performed by the user on the document editing area 345 on the editing interface of the Word application, the laptop invokes the program corresponding to the file editing area 345 to process the data of the picture.

Figure 4E:
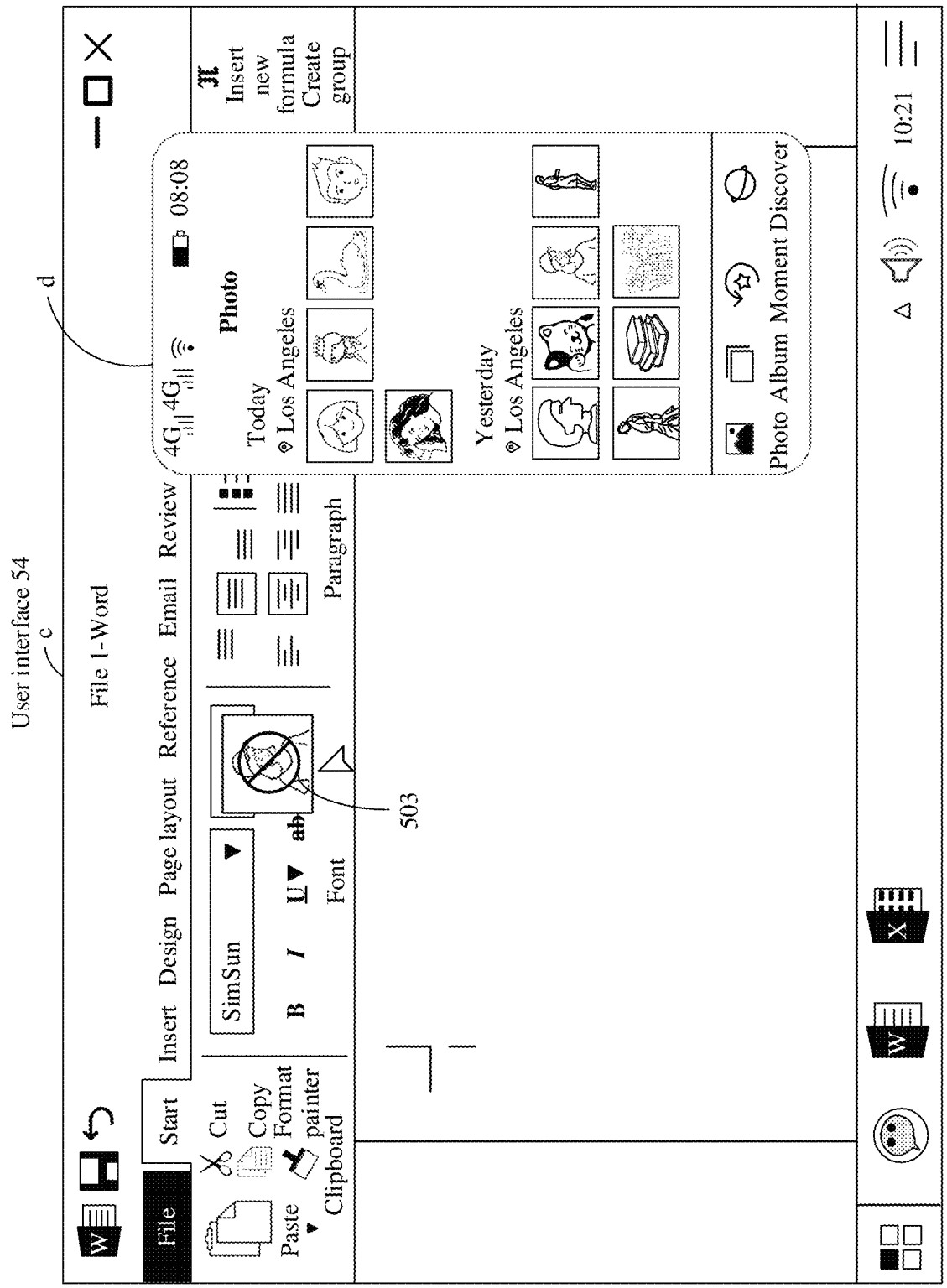
FIG. 4E is a schematic diagram of a user interface for displaying a prohibitive sign according to an embodiment.

Refer to FIG. 4E, in some other embodiments, in a process in which the user drags the icon 505 in the window c, when the laptop detects that the mouse pointer 311 moves to a toolbar that cannot receive a picture, the laptop displays a prohibitive sign 503 in the icon 505. The prohibitive sign 503 is used to indicate that the toolbar cannot receive the picture. Not limited to the prohibitive sign 503 shown as an example in FIG. 4E, the prohibitive sign 503 may alternatively be another style. For example, the prohibitive sign 503 may be a red (or may be another color) prompt box displayed around the icon 505 or may be an "x"-shaped icon, or the like. This is not limited in the embodiments of this application. Optionally, when the laptop detects that the mouse pointer 311 moves to the toolbar that cannot receive a picture, the laptop may further display prompt information. The prompt information is used to indicate that the toolbar cannot receive a picture.

In some other embodiments, data corresponding to the selected event is texts. In this case, in the foregoing step S106, in a process in which the smartphone sends the texts to the laptop, the smartphone does not need to determine a storage address of the texts and then read the texts from the storage address, and the smartphone may directly copy the texts. In an implementation process of step S107, the multi-screen proxy service module of the laptop does not need to store the texts, and directly sends the texts to the Word application for processing.

In other possible implementations, the window c of the laptop may further display an interface of another application. The following describes other projection scenarios.

Figure 5A:
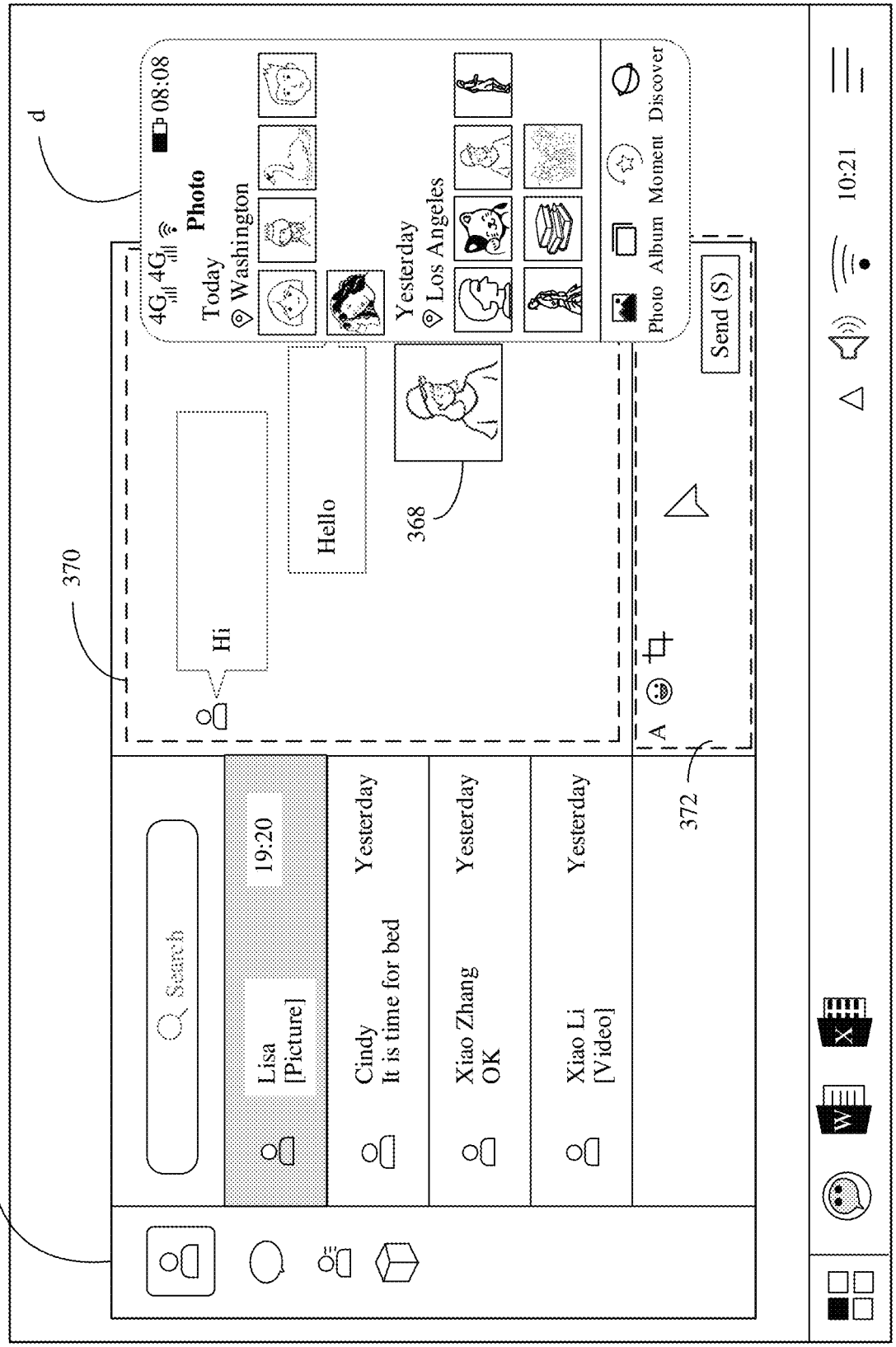
FIG. 5A is a schematic diagram of another user interface of projecting a screen of a smartphone to a laptop according to an embodiment.
Figure 5B:
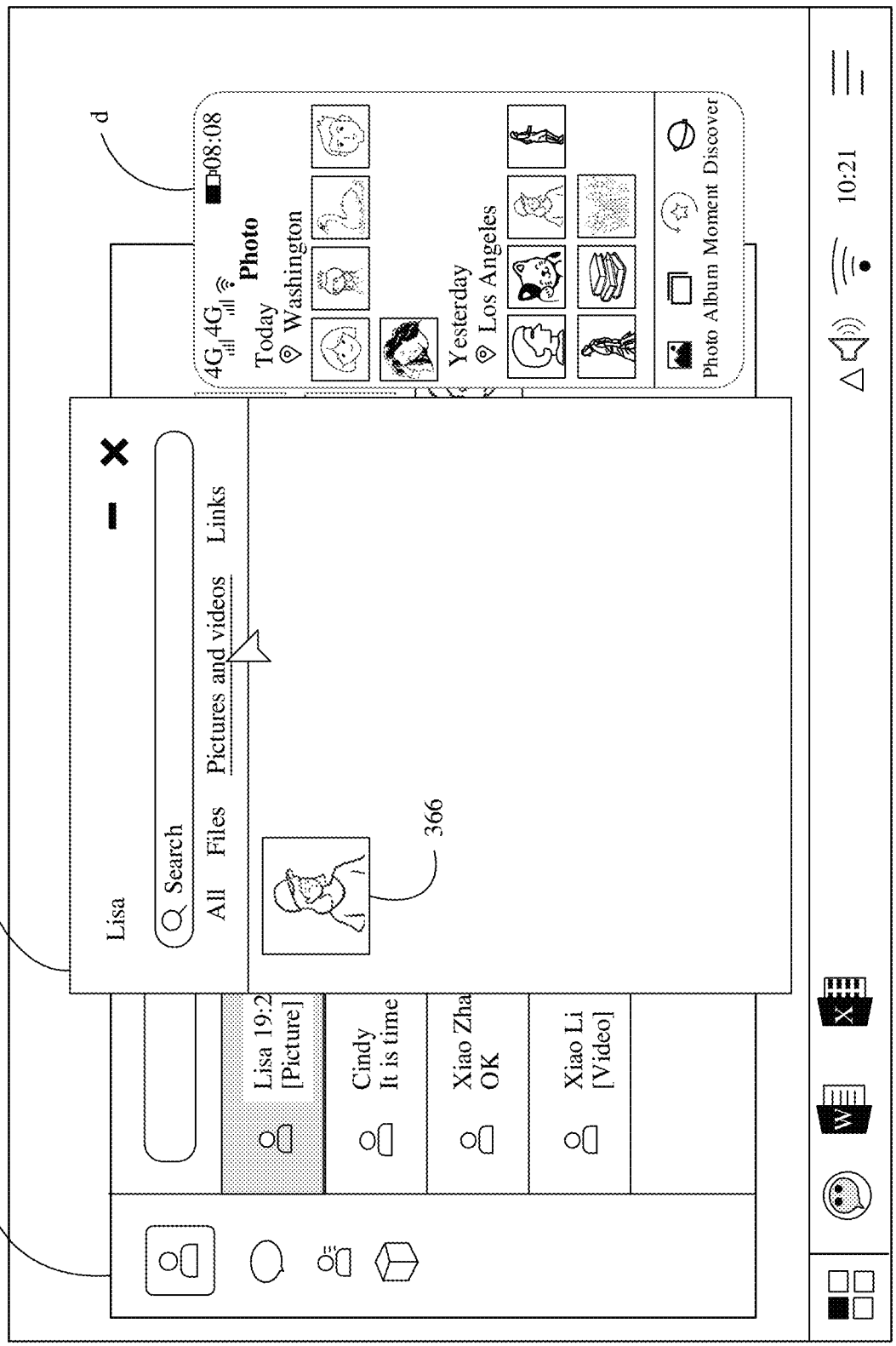
FIG. 5B is a schematic diagram of a user interface for displaying a chat record according to an embodiment.

Projection scenario 2: A display interface of the "Gallery" application on the smartphone and a chat interface of WeChat (WeChat) on the laptop are simultaneously displayed on the display of the laptop. "WeChat" is an instant messaging software on the laptop. FIG. 5A is a schematic diagram of a user interface 61 of projecting a screen of the smartphone to the laptop according to the embodiments of this application. The user interface 61 includes the window c, the window d, and the status bar 310. The window c displays the chat interface of WeChat. The chat interface of WeChat includes a message list, a display area 370, and an input box 372.

Refer to the data transmission manner described in the foregoing projection scenario 1. In response to an operation of the user dragging the picture corresponding to the thumbnail 303-1 from the window d to the input box 372, the laptop sends indication information to the smartphone. In response to the indication information, the smartphone sends the data of the picture to the laptop. After the laptop receives the data of the picture, the multi-screen proxy service module stores the picture, and sends a storage path of the data of the picture to the WeChat application. The WeChat application invokes a program corresponding to the input box 372 to process the data of the picture. The WeChat application reads the picture from the storage path, sends the picture to a chat object (namely, Lisa), and displays an icon 368 of the picture as a message record in the display area 370. For example, the icon 368 is displayed below a recent message record.

In addition, the WeChat application may store the picture in a storage space of a chat record with the chat object. For example, refer to a user interface 62 shown in FIG. 5B. A window g in the user interface 62 is used to display a display interface of a chat record between the user using the laptop and the chat object (namely, "Lisa"). The display interface uses a record of "pictures and videos" as an example. An icon 366 of the transferred picture may be viewed in the record. The user taps the icon 366, and in response to the tap operation, the laptop displays the picture.

In some other possible implementations, before the laptop sends the first indication information to the smartphone, the laptop determines, based on the file information about the picture, that the input box 372 can receive the picture. A determining manner may be: The laptop determines a preset condition of a file object that can be received by the input box 372. The laptop compares the file information about the picture with the preset condition, and if the file information meets the preset condition, the laptop determines that the input box 372 can receive the picture. For example, the preset condition indicates a format and a maximum file size of the file object that can be received by the input box 372. In this case, if the file format that can be received by the input box 372 includes a file format indicated in the file information, and the maximum file size that can be received by the input box 372 is not less than a file size indicated in the indication information, the file information meets the preset condition, and the input box 372 can receive the picture. It should be noted that the preset condition of the file object that can be received by the input box 372 may be determined when the WeChat application program is written.

In some other examples, the file object dragged by the user is a 10M GIF, and the input box 372 may receive a maximum of a 5M GIF. In this case, the laptop determines that the input box 372 cannot receive the GIF, and the laptop does not send the indication information to the smartphone. Optionally, the laptop may display prompt information, and the prompt information is used to indicate that the input box 372 cannot receive the GIF.

In some other examples, the data dragged by the user is texts, and the WeChat application displays the texts in the input box 372. If the user taps a message sending control, in response to the tap operation, the WeChat application sends the texts to the chat object and displays the texts as a message record in the display area 370. For example, the texts are displayed below the recent message record. In addition, the WeChat application stores the texts in the storage space of the chat record with the chat object.

In some other possible embodiments, a determining event is used to determine an application that receives the file object, and a specific control that receives the file object is not distinguished. In this case, before the laptop sends the first indication information to the smartphone, the laptop determines, based on the file information about the picture, that the WeChat application can receive the picture. A determining manner may be: The laptop determines a preset condition of a file object that can be received by the WeChat application. The laptop compares the file information about the picture with the preset condition, and if the file information meets the preset condition, the laptop determines that the WeChat application can receive the picture. For example, the preset condition may indicate a format and/or a maximum file size of the file object that can be received by the WeChat application. The preset condition of the file object that can be received by the WeChat application may be determined when the WeChat application program is written. Then, after receiving the picture sent by the smartphone, the multi-screen proxy service module stores the picture, and sends a storage path of data of the picture to the WeChat application. The WeChat application processes the data of the picture.

Projection scenario 3: The display interface of the "Gallery" application on the smartphone and an interface of "This PC" on the laptop are simultaneously displayed on the display of the laptop. "This PC" is a file resource management application on the laptop. This application can be used to view a file stored in basic hardware resources of the laptop, copy, paste, and move a file, and format a disk.

Figure 5C:
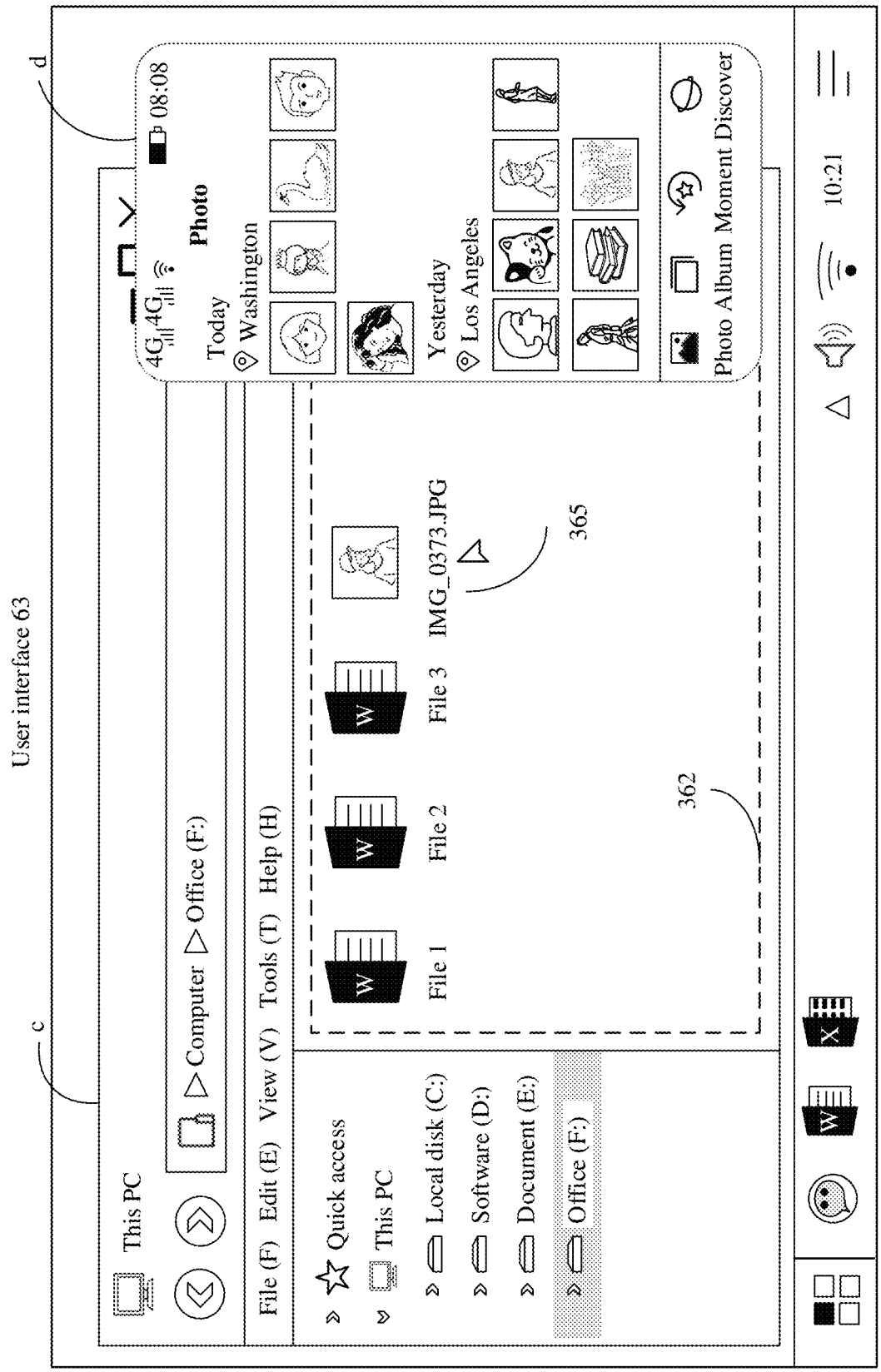
FIG. 5C is a schematic diagram of another user interface of projecting a screen of a smartphone to a laptop according to an embodiment.
Figure 5D:
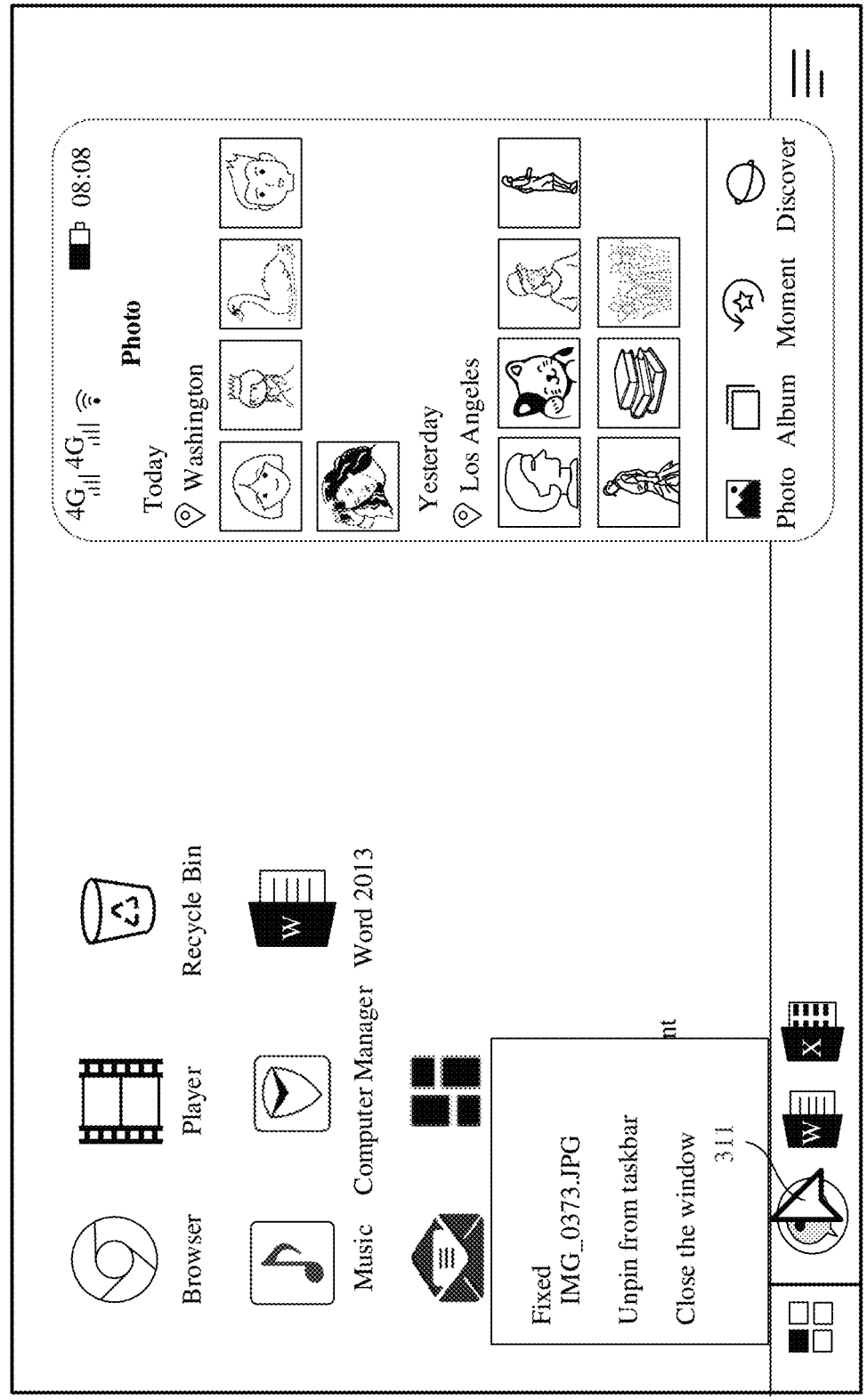
FIG. 5D is a schematic diagram of a user interface for displaying a recent browsing history list of a WeChat application according to an embodiment.

FIG. 5C is a schematic diagram of a user interface 63 of projecting a screen of the smartphone to the laptop according to the embodiments of this application. The user interface 63 includes the window c, the window d, and the status bar 310. The window c displays an interface of "This PC". The interface of the "This PC" includes a title bar, a details bar, a menu bar, an address option bar 358, and a display area 362.

The address option bar 358 may be used to display one or more address options. Address options in an example include Quick access, This PC, and more detailed addresses under This PC (for example, Local disk (C:), and Software (D:)). It should be noted that one or more detailed addresses may alternatively exist under Quick access, and another address option may further exist in the address option bar.

The figure is merely an example. The display area 362 may be used to display information about a file stored in a selected address (that is, Office (F:)). In an example, the display area 362 includes an icon 336-1 of a file 1, an icon 336-2 of a file 2, and an icon 336-3 of a file 3. A manner of displaying a file in the display area may include: a super-large icon, a large icon, a medium icon, a small icon, a list, details, a tile, content, and the like. A file in the example shown in the figure is displayed in a large icon and may be displayed in another manner. This is not limited in the embodiments of this application.

Refer to the data transmission manner described in the foregoing projection scenario 1. In response to an operation of the user dragging an icon corresponding to the thumbnail 303-1 from the window d to the display area 362, the laptop sends indication information to the smartphone. In response to the indication information, the smartphone sends the picture to the laptop. After the laptop receives the picture, the multi-screen proxy service module stores the picture, and sends the storage path of the data of the picture to the "This PC". "This PC" invokes a program corresponding to the display area 362 to process the picture. "This PC" reads the picture based on the storage path, stores the picture in a storage space of Office (F:), displays a large icon 365 of the picture in the display area 362, and displays an image name IMG_0373.JGP below the large icon. It should be noted that the multi-screen proxy service module may store the data of the picture and the file information about the picture, and "This PC" may read the data and the file information about the picture based on the storage path.

In some other examples, if the user drags the icon corresponding to the thumbnail 303-1 from the window d to an address option of Document (E:), "This PC" reads the picture based on the storage path and stores the picture in a storage space of Document (E:).

Projection scenario 4: The window c displays an email editing interface of a Mailbox application. In response to an operation of the user dragging the icon corresponding to the thumbnail 303-1 from the window d to an email editing area, similar to the foregoing process, the multi-screen proxy service module stores the picture, and sends the storage path of the data of the picture to the Mailbox application. The Mailbox application reads the picture based on the storage path and displays the picture as an email attachment on the editing interface. In addition, the Mailbox application stores the picture in a cache space of the Mailbox application. Further, after the user taps a sending control of an email, the mailbox sends the email, and stores the picture as an attachment of the email in a storage space corresponding to the email.

Projection scenario 5: A desktop and the window d are displayed on the laptop, and a display interface of the Gallery application on the smartphone is displayed in the window d. In response to an operation of the user dragging the icon corresponding to the thumbnail 303-1 from the window d to a WeChat icon in the status bar 310 on the desktop, similar to the foregoing process, the multi-screen proxy service module stores the picture, and sends the storage path of the data of the picture to the WeChat application corresponding to the WeChat icon. The WeChat application reads the picture based on the storage path and may store the picture in the storage space corresponding to the WeChat application. Optionally, the WeChat application may further display the picture in a fixed column of a recent browsing history list. For such a display manner, refer to a user interface 64 shown in FIG. 5D. It should be noted that the user may right-click the WeChat icon to open the recent browsing history list of the WeChat application. The WeChat application may further process the picture in another manner. This is not limited in the embodiments of this application.

The following describes a second case of the data transmission manner shown in the embodiments of this application.

Projection scenario 6: A user interface of "WeChat (WeChat)" is displayed on the display of the smartphone. The display content of the smartphone is projected to the display of the laptop for display. The display content of the smartphone and an application interface of "This PC" are simultaneously displayed on the display of the laptop. "WeChat" is an instant messaging application on the smartphone. "This PC" is a file resource management application on the laptop. This application can be used to view a file stored in basic hardware resources of the laptop, copy, paste, and move a file, and format a disk.

Figure 6A:
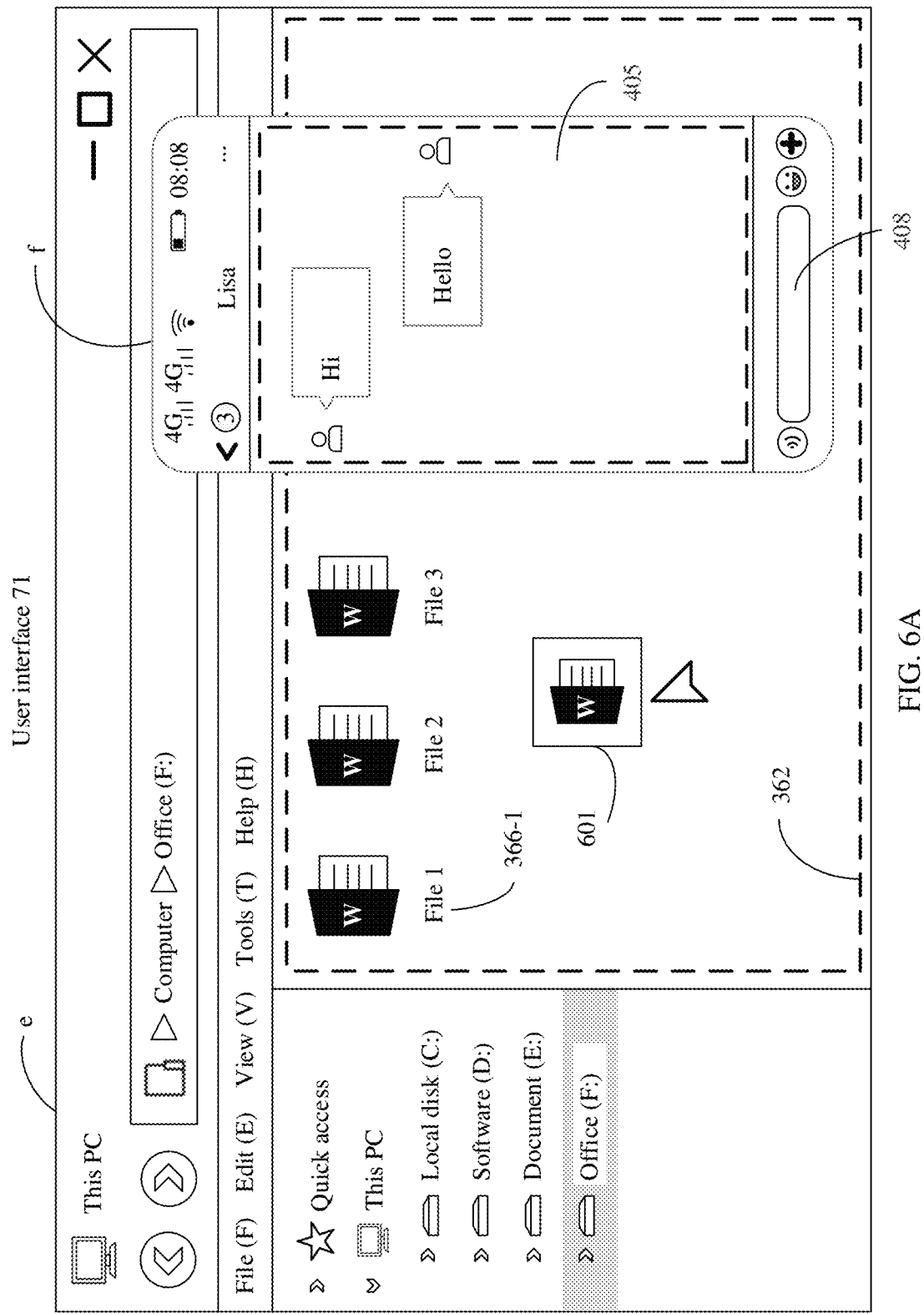
FIG. 6A is a schematic diagram of another user interface of projecting a screen of a smartphone to a laptop according to an embodiment.

FIG. 6A is a schematic diagram of another user interface 71 of projecting a screen of the smartphone to the laptop according to the embodiments of this application. The user interface 61 includes a window e and a window f. The window e is used to display the application interface of "This PC" on the laptop, and the window f is used to display an application interface of WeChat on a mobile terminal. For example, the window f includes a display area 405 and an input box 408. The display area 405 may be used to display an instant chat message. These instant chat messages are stored in a chat record between the user using the electronic device and the current chat object (namely, Lisa). The input box 408 may be used to receive information entered by the user. It should be noted that, in a user interface displayed in the window f, the input box 408 may receive a file object. Optionally, a format and/or a size of a file object that can be received by the input box 408 may be set. For example, a maximum size of a file in a graphics interchange format (GIF) that can be received by the input box 408 is 5 megabytes (MB). For description of the interface of "This PC" displayed in the window f, refer to the description of the user interface 63 shown in FIG. 5C. Details are not described herein again.

Figure 7:
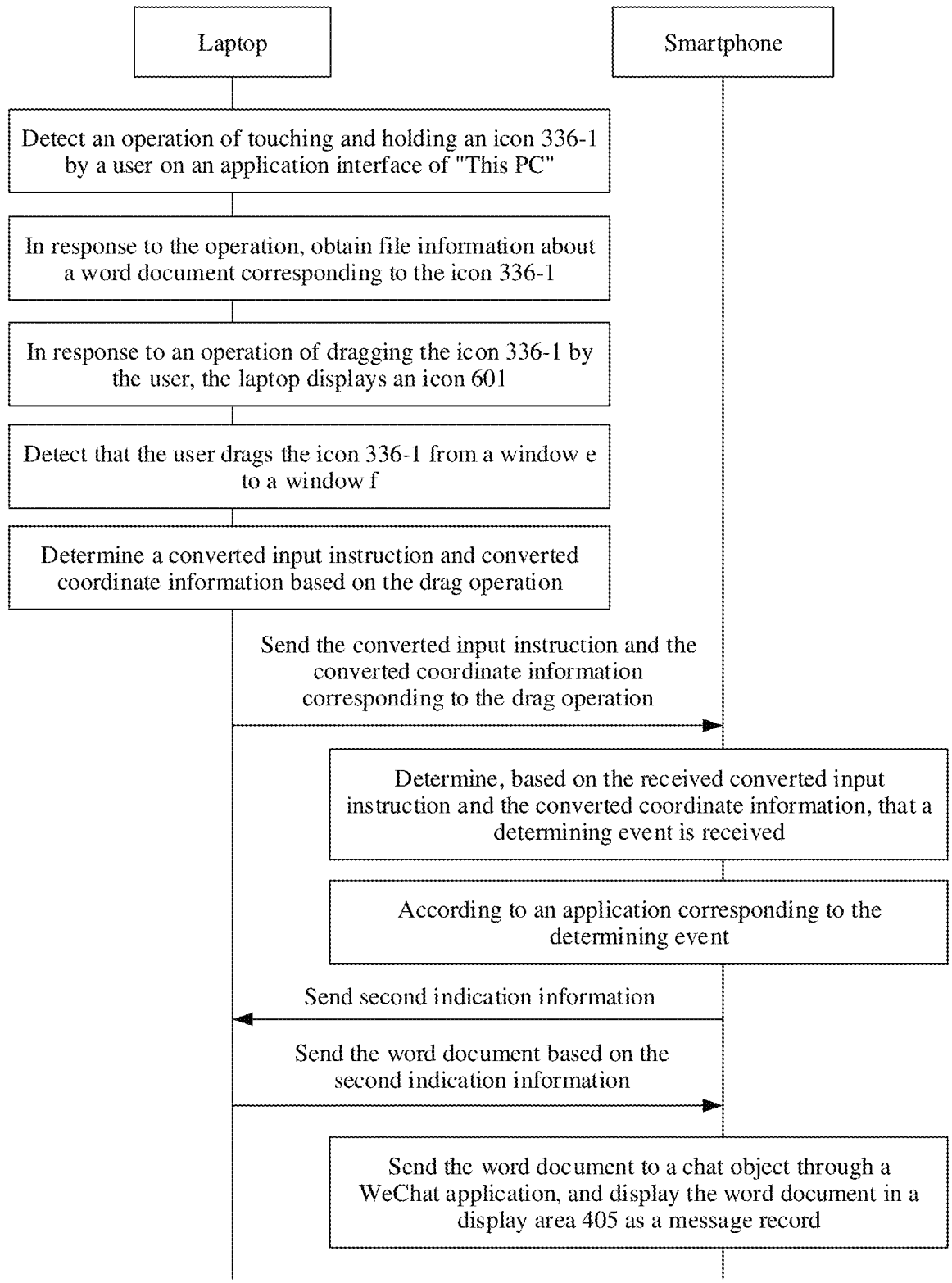
FIG. 7 is a flowchart of another data transmission method according to an embodiment.

A projection scenario shown in FIG. 6A is used as an example below to describe a process of transmitting data from "This PC" on the laptop to the WeChat application on the smartphone. For the process, refer to a method flowchart shown in FIG. 7. The method includes the following steps.

S201: In response to an operation of touching and holding the icon 336-1 by the user on the application interface of "This PC", the laptop obtains file information about a word document corresponding to the icon 336-1.

In an optional implementation, in the projection scenario, after detecting that the operation entered by the user acts on the interface of "This PC", the monitoring module sends the original input instruction and the coordinate information to a processor of the laptop, to determine an input event and a control corresponding to the input event. The monitoring module may determine, based on coordinate information about the original input instruction and a coordinate area of the interface of "This PC", that the operation is performed on the interface of "This PC". The input event may be a tap event, a double-tap event, a touch-and-hold event, a force touch event, a drag event, or the like.

The processor of the laptop determines, based on the original input instruction and the coordinate information, that a touch-and-hold event for the icon 336-1 on the application interface of "This PC" is received. The laptop determines that the touch-and-hold event is a selected event, and in response to the selected event, "This PC" sends, to the multi-screen proxy service module in the projection module, the file information about the word document corresponding to the icon 336-1. The file information may be one or more a name, a size, a format, an icon, and the like of the word document. The laptop may preset a type of obtained file information. The laptop may prestore an event type of a selected event. For example, the selected event may be one or more of a tap event, a double-tap event, a touch-and-hold event, a force touch event, a drag event, or the like. The selected event is used to select the file object to be transferred.

In a possible implementation, in response to the selected event, "This PC" may display content that the icon 336-1 is selected. For example, that the icon 336-1 is selected may be displayed by displaying a highlighted box around the icon 336-1, displaying an identifier (for example, "√") on the icon 336-1, or changing a display color of the icon 336-1.

S202: In response to an operation of dragging the icon 336-1 by the user, the laptop displays an icon 601.

The icon 601 is used to indicate a drag position of the document, and a display position of the icon 601 changes with movement of the mouse pointer 311. The icon 601 may be generated based on the icon 336-1 or may be generated based on the file information about the word document.

Optionally, in a process in which the mouse pointer 311 moves from the window e to the window f, the icon 601 may be continuously displayed.

S203: When it is detected that the user drags the icon 336-1 from the window e to the window f, the laptop determines a converted input instruction and converted coordinate information based on the drag operation, and sends, to the smartphone, the converted input instruction and the converted coordinate information that are corresponding to the drag operation.

S204: When the smartphone determines, based on the received converted input instruction and the converted coordinate information, that a determining event is received, the smartphone determines an application corresponding to the determining event.

The determining event may be a tap event, a double-tap event, a touch-and-hold event, a force touch event, a drag event, or the like. A drag event is used as an example. For the smartphone, the determining event may be a drag event dragging from an edge of the application interface of WeChat to the input box 408 for lifting. The determining event may be used to select an application that receives the file object.

For example, the smartphone may determine, through the input manager, that the determining event is received based on the received converted input instruction and the converted coordinate information. The smartphone may determine, through the window manager and based on the converted coordinate information, that an application displayed in a display area corresponding to the determining event is the WeChat application.

S205: The smartphone sends second indication information to the laptop, where the second indication information is used to indicate the laptop to send data of the word document to the smartphone.

S206: After the laptop receives the second indication information, the laptop sends the data and the file information about the word document to the smartphone based on the second indication information.

A process in which the laptop sends the data of the word document to the smartphone based on the second indication information may be as follows: The laptop copies the data of the word document from a storage space based on a storage path of the word document and sends the data of the word document to the laptop. A manner in which the laptop determines the storage path of the word document may be as follows: In step S201, the laptop obtains the storage path of the word document while obtaining the file information about the word document. A manner in which the laptop determines the storage path of the word document may alternatively be as follows: After receiving the second indication information sent by the smartphone, the laptop obtains the storage path of the word document from "This PC".

S207: After the smartphone receives the data of the picture, the smartphone sends the word document to the chat object through the WeChat application and displays the word document in the display area 405 as a message record.

Figure 6B:
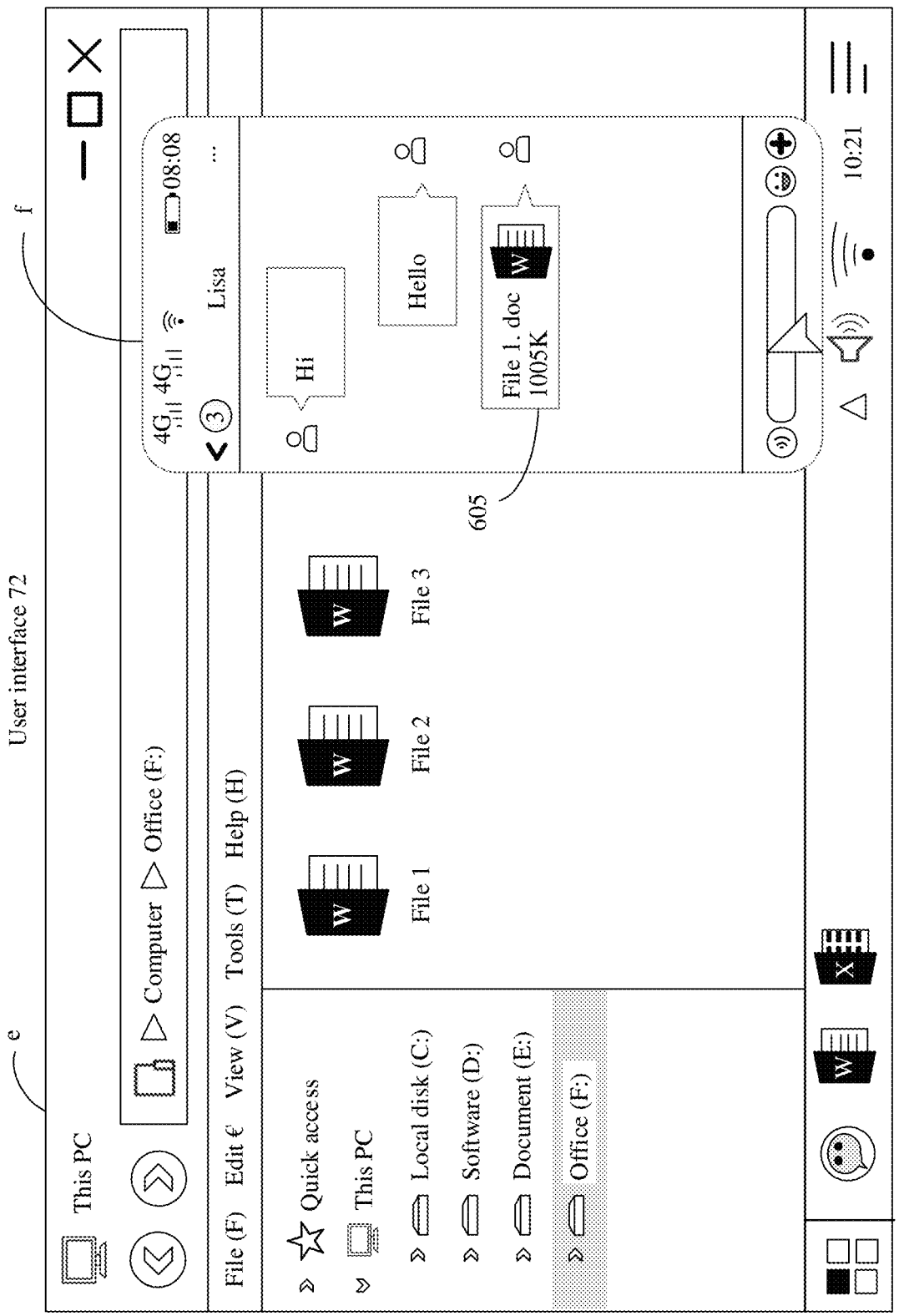
FIG. 6B is a schematic diagram of another user interface for displaying a chat interface according to an embodiment.
Figure 6C:
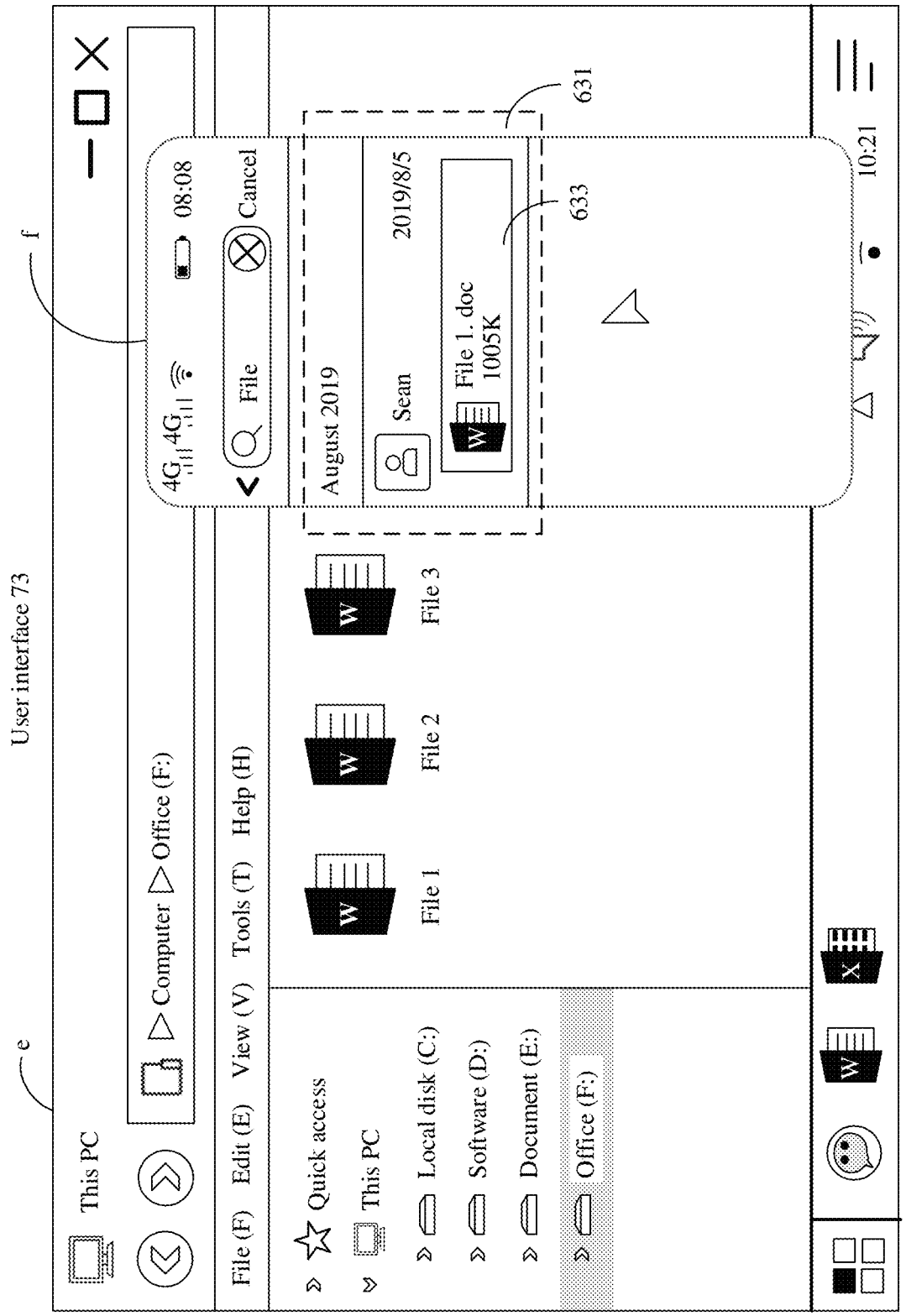
FIG. 6C is a schematic diagram of another user interface for displaying a chat record according to an embodiment.

For such a display manner, refer to a user interface 72 shown in FIG. 6B. For example, for a specific implementation process of step S208, refer to the following steps:

S21: The multi-screen proxy service module in the smartphone parses, by using a content parsing and distribution module, received data (a data bit stream) into a word document (which can also be other data, for example, a picture, a video, or audio) that can be read by an application on the smartphone, stores the parsed data in a content storage module, and generates a storage path of the word document.

S22: The multi-screen proxy service module in the smartphone sends the storage path of the word document to the WeChat application.

S23: The WeChat application on the smartphone processes the word document.

For example, the WeChat application reads the word document from the storage path, sends the word document to the chat object, and displays an icon 605 of the word document as a message record in the display area 405. For example, the icon 605 is displayed below a recent message record. In addition, the WeChat application may store the word document in the storage space of the chat record with the chat object. For example, the display interface of WeChat may be operated, so that the window f is switched to a file display interface of WeChat. For details, refer to a user interface 73 shown in FIG. 6C. The file display interface includes a display area 631. The display area 631 includes file information in a chat record between the user (for example, "Sean") using the smartphone and the chat object (namely, "Lisa"). The display area 631 further includes a control 633. The user taps the control 633, and in response to the tap operation, the smartphone reads the locally stored file 1, and displays content of the file 1 on the display. Display content in the window f on the laptop changes with display content of the smartphone, that is, the laptop displays the content of the file 1 in the window f. In this manner, the user can conveniently transfer a word document in "This PC" on the laptop to the WeChat application on the smartphone. This improves data sharing efficiency.

In some other possible implementations, when detecting that the user drags the mouse pointer 311 from the window e to the window f, the laptop sends the data of the word document to the smartphone. Correspondingly, the smartphone receives the data of the word document. Then, when the smartphone determines, based on the received converted input instruction and the converted coordinate information, that the determining event is received, the smartphone determines the application corresponding to the determining event. Then, the smartphone sends the word document to the chat object through the WeChat application and displays the word document below the recent message record as a message record.

In some other possible implementations, when detecting that the user drags the mouse pointer 311 from the window e to the window f, the laptop may further send the file information about the word document to the smartphone. When the mouse pointer 311 moves from the window e to the window f, the laptop no longer displays the icon 601. In some other possible implementations, in step S203, when detecting that the user drags the icon 336-1 from the window e to the window f, the laptop may further send the file information about the word document to the smartphone. After step S204 and before step S205, the smartphone determines that the WeChat application can receive (or referred to as process) the word document. A determining manner may be: The smartphone determines a preset condition of a file object that can be received by the WeChat application. The laptop compares the file information about the word document with the preset condition, and if the file information meets the preset condition, the laptop determines that the WeChat application can receive the word document. It should be noted that the preset condition of the file object that can be received by the WeChat application may be determined when the WeChat application program is written. For example, the preset condition may indicate a format and a maximum file size of the file object that can be received by the WeChat application. In some other examples, if a dialing interface of a Phone application is displayed in the window f, the smartphone determines that the Phone application cannot receive the word document, and the smartphone displays a prohibitive sign on a second user interface. In still another possible implementation, the icon 601 generated by the laptop is continuously displayed in a drag process. In this case, the smartphone sends third indication information to the laptop. The third indication information is used to indicate that the Phone application cannot receive the word document. The laptop may display the prohibitive sign on the icon 601 based on the third indication information. The prohibitive sign is used to indicate that the Phone application cannot receive the word document. In addition, the smartphone does not send the second indication information to the laptop.

In some other possible implementations, in step S203, when detecting that the user drags the icon 336-1 from the window e to the window f, the laptop may further send the file information about the word document to the smartphone. The smartphone may generate and display a file icon corresponding to the word document based on the file information. The file icon is used to indicate a drag position of the word document. After step S204 and before step S205, the smartphone determines that the input box 408 corresponding to the determining event can receive (or referred to as process) the word document. That is, in the embodiments, after the smartphone determines that the determining event is received, the smartphone determines the input box 408 corresponding to the determining event. For example, the smartphone may determine, through the window manager and a view manager and based on the converted coordinate information, the input box 408 corresponding to the determining event. Then, the smartphone compares the preset condition of the file object that can be received by the input box 408 with the file information about the word document, to determine that the input box 408 can receive the word document. For example, the preset condition may indicate a format and a maximum file size of the file object that can be received by the WeChat application. In some other examples, if the determining event is a drag event of dragging from an edge of the application interface of WeChat to the display area 405 for lifting, the smartphone determines that the display area 405 corresponding to the determining event cannot receive the word document, and the smartphone displays the prohibitive sign in the displayed file icon. In still another possible implementation, the smartphone does not generate the file icon, and the icon 601 generated by the laptop is continuously displayed in a drag process. In this case, the smartphone sends fourth indication information to the laptop. The fourth indication information is used to indicate that the display area 405 cannot receive the word document. The laptop may display the prohibitive sign on the icon 601 based on the fourth indication information. The prohibitive sign is used to indicate that the display area 405 cannot receive the word document. In addition, the smartphone does not send the second indication information to the laptop.

The foregoing describes the data transmission process provided in the embodiments of this application. In some embodiments, after the smartphone is projected to the laptop, the laptop may determine, based on a preset selected event and an event type of a determining event, whether the selected event/determining event is received. In other words, in a case in which a preset event type conflicts with an existing mechanism for determining an input event in the laptop, a mechanism for determining a selected event/determining event is used as a determining standard. For example, the preset selected event is a double-tap event. In the existing mechanism for determining an input event in the laptop, an input event of double-tapping an icon of a word document is determined as an event of opening the word document. However, in the projection scenario, if the user double-taps an icon of a word document, the laptop determines that the selected event is received, and can obtain file information about the word document, but does not open the word document. Similarly, in the projection scenario, the smartphone may also determine, based on the preset selected event and the event type of the determining event, whether the selected event/determining event is received. In a case in which a preset event type conflicts with an existing mechanism for determining an input event in the smartphone, a mechanism for determining a selected event/determining event is used as a determining standard. In some possible implementations, the preset selected event and the event type of the determining event may be different from an event type of a commonly used input event.

Figure 8:
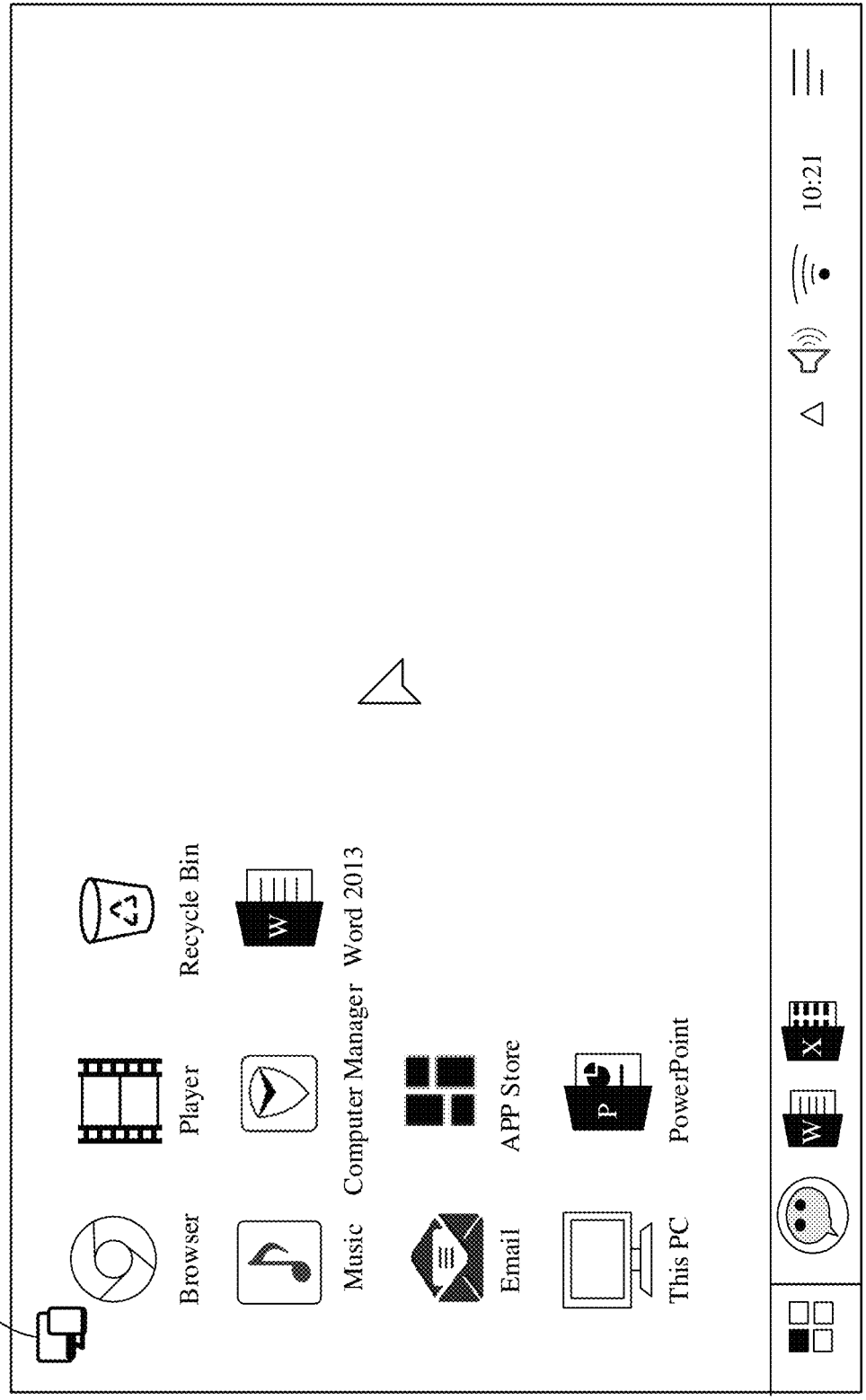
FIG. 8 is a schematic diagram of a user interface for displaying a data transmission control according to an embodiment.

In some other embodiments, after the smartphone projects the display content to the laptop, and before the file object to be transferred is determined, the user may enable or disable the data transmission function by operating a data transmission control. For a display manner of the data transmission control, refer to a user interface 81 shown in FIG. 8. For example, when a data transmission control 801 is displayed in a first state, it indicates that the data transmission function is enabled, and the laptop may determine, based on the preset selected event and the event type of the determining event, whether the selected event/determining event is received. In a case in which the preset event type conflicts with the existing mechanism for determining an input event in the laptop, the mechanism for determining a selected event/determining event is used as the determining standard. When the data transmission control 801 is displayed in a second state, it indicates that the data transmission function is disabled, and the laptop does not determine the selected event/determining event. The first state is different from the second state. In a possible implementation, in the projection scenario, the data transmission control 801 may always be displayed in front of all windows, and a display position of the data transmission control 801 may be adjusted.

It should be noted that enabling or disabling the data transmission function of the smartphone is synchronous with enabling or disabling the data transmission function of the laptop. For example, after projection is enabled, the laptop sends, to the smartphone, information indicating whether the data transmission function is enabled or disabled currently. In a projection process, when the user switches enabling or disabling of the data transmission function, the laptop sends, to the smartphone, information indicating the switching. Similarly, when the data transmission function is enabled, the smartphone may determine, based on the preset selected event and the event type of the determining event, whether the selected event/determining event is received. When the data transmission function is disabled, the smartphone does not determine the selected event/determining event.

It should be noted that the foregoing embodiments describe a scenario in which display content of a projection device is projected to a large-screen device. In actual application, display content of two or more projection devices may be projected to a display interface of a large-screen device. In a similar manner, data is transmitted from an application of the large-screen device to an application of the projection device, or data is transmitted from the application of the projection device to the application of the large-screen device.

The foregoing embodiments are merely intended for describing the solutions, but not for limiting. Although described in detail with reference to the foregoing embodiments, a person of ordinary skill in the art should understand that modifications to the solutions recorded in the foregoing embodiments or equivalent replacements to some features thereof may still be made, without departing from the scope of the solutions of the embodiments.

What is claimed is:

1. A data transmission method comprising:
   receiving, by a first device, data of a second user interface sent by a second device, wherein the second user interface is a user interface being displayed by the second device, and the second user interface comprises one or more file objects;
   displaying, by the first device, a first user interface in a first display area of a display and the second user interface in a second display area of the display, wherein the first user interface is a user interface of a first application running on the first device;
   detecting, by the first device, one or more operations of moving a file object in the second user interface to the first user interface, wherein the one or more operations are detected from a plurality of different operation instructions based upon comparisons of touch operation intensities to a pressure threshold;
   executing an instruction for viewing a picture when a touch operation intensity is less than the pressure threshold;
   executing an instruction for selecting the picture when a touch operation intensity is greater than or equal to the pressure threshold;
   in response to the one or more operations, sending, by the first device, a piece of information generated by the one or more operations to the second device;
   receiving, by the first device, the file object sent by the second device;
   storing the file object;
   providing a storage path of the file object or providing the file object for the first application, wherein the first application is a picture editing application or a text editing application, and the first user interface is a picture or text editing interface; and
   after providing the storage path of the file object or providing the file object for the first application, the method further comprises:
   displaying, by the first device, the file object at an editing location of the first user interface, wherein the editing location is a location that is being edited on the first user interface before the one or more operations is detected or is a location corresponding to the one or more operations.

2. The data transmission method according to claim 1, further comprising:
   receiving, by the first device, file information about the file object sent by the second device, wherein the file information comprises at least one of a format or a size of the file object;
   determining, by the first device, a preset condition of the file object that can be received by the first application, wherein the preset condition indicates the format or a maximum file size of a file object that can be received by the first application; and
   determining, by the first device based on the preset condition and the file information about the file object, that the file object meets the preset condition.

3. The data transmission method according to claim 1, further comprising:
   receiving, by the first device, file information about the file object sent by the second device, wherein the file information comprises at least one of a format or a size of the file object;
   determining, by the first device, a preset condition of the file object that can be received by the first application, wherein the preset condition indicates the format or a maximum file size of the file object that can be received by the first application;
   determining, by the first device based on the preset condition and the file information about the file object, that the file object does not meet the preset condition; and
   displaying, by the first device, a prohibitive sign in an area corresponding to the one or more operations, wherein the prohibitive sign is used to indicate that the first application cannot receive the file object.

4. The data transmission method according to claim 1, wherein the one or more operations comprise: a touch-and-hold operation, a drag operation, a tap operation, a double-tap operation, or a force touch operation.

5. The data transmission method according to claim 1, further comprising:
   detecting, by the first device, another or more operations of moving another file object of the first application interface to the second user interface; and
   sending, by the first device, the another file object to the second device in response to the another or more operations, so that the second device provides a storage path of the another file object or the another file object to the second application.

6. The data transmission method according to claim 2, further comprising:
   detecting, by the first device, another or more operations of moving another file object of the first application interface to the second user interface; and sending, by the first device, the another file object to the second device in response to the another or more operations, so that the second device provides a storage path of the another file object or the another file object to the second application.

7. The data transmission method according to claim 3, further comprising:
   detecting, by the first device, another or more operations of moving another file object of the first application interface to the second user interface; and
   sending, by the first device, the another file object to the second device in response to the another or more operations, so that the second device provides a storage path of the another file object or the another file object to the second application.

8. The data transmission method according to claim 3, further comprising:
   detecting, by the first device, another or more operations of moving another file object of the first application interface to the second user interface; and
   sending, by the first device, the another file object to the second device in response to the another or more operations, so that the second device provides a storage path of the another file object or the another file object to the second application.

9. An electronic device comprising:
   a processor;
   a memory; and
   a display, wherein the memory is coupled to the processor to store instructions, which when executed by the processor, cause the processor to perform operations comprising:
   receiving data of a second user interface sent by a second device, wherein the second user interface is a user interface being displayed by the second device, and the second user interface comprises one or more file objects;
   displaying a first user interface in a first display area of a display and the second user interface in a second display area of the display, wherein the first user interface is a user interface of a first application running on the electronic device;
   detecting one or more operations of moving a file object in the second user interface to the first user interface, wherein the one or more operations are detected from a plurality of different operation instructions based upon comparisons of touch operation intensities to a pressure threshold;
   executing an instruction for viewing a picture when a touch operation intensity is less than the pressure threshold;
   executing an instruction for selecting the picture when a touch operation intensity is greater than or equal to the pressure threshold;
   in response to the one or more operations, sending information generated by the one or more operations to the second device;
   receiving the file object sent by the second device;
   storing the file object;
   providing a storage path of the file object or providing the file object for the first application, wherein the first application is a picture editing application or a text editing application, and the first user interface is a picture or text editing interface; and
   after the providing the storage path of the file object or providing the file object for the first application, the method further comprises:
   displaying the file object at an editing location of the first user interface, wherein the editing location is a location that is being edited on the first user interface before the one or more operations is detected or is a location corresponding to the one or more operations.

10. The electronic device according to claim 9, the operations further comprising:
    receiving file information about the file object sent by the second device, wherein the file information comprises at least one of a format or a size of the file object;
    determining a preset condition of a file that can be received by the first application, wherein the preset condition indicates the format or a maximum file size of the file object that can be received by the first application; and
    determining based on the preset condition and the file information about the file object, that the file object meets the preset condition.

11. The electronic device according to claim 9, the operations further comprising:
    receiving file information about the file object sent by the second device, wherein the file information comprises at least one of a format or a size of the file object;
    determining a preset condition of a file that can be received by the first application, wherein the preset condition indicates the format or a maximum file size of a file object that can be received by the first application;
    determining based on the preset condition and the file information about the file object, that the file object does not meet the preset condition; and
    displaying a prohibitive sign in an area corresponding to the one or more operations, wherein the prohibitive sign is used to indicate that the first application cannot receive the file object.

12. The electronic device according to claim 9, wherein the one or more operations comprise: a touch-and-hold operation, a drag operation, a tap operation, a double-tap operation, or a force touch operation.

13. The electronic device according to claim 9, the operations further comprising:
    detecting another or more operations of moving another file object of the first application interface to the second user interface; and
    sending the another file object to the second device in response to the another or more operations, so that the second device provides a storage path of the another file object or the another file object to the second application.

14. The electronic device according to claim 10, the operations further comprising:
    detecting another or more operations of moving another file object of the first application interface to the second user interface; and
    sending the another file object to the second device in response to the another or more operations, so that the second device provides a storage path of the another file object or the another file object to the second application.

15. The electronic device according to claim 11, the operations further comprising:
    detecting another or more operations of moving another file object of the first application interface to the second user interface; and
    sending the another file object to the second device in response to the another or more operations, so that the second device provides a storage path of the another file object or the another file object to the second application.

16. The electronic device according to claim 12, the operations further comprising:
   detecting another or more operations of moving another file object of the first application interface to the second user interface; and
   sending the another file object to the second device in response to the another or more operations, so that the second device provides a storage path of the another file object or the another file object to the second application.

17. An electronic device comprising:
   a processor;
   a memory; and
   a display, wherein the memory is coupled to the processor to store instructions, which when executed by the processor, cause the processor to perform operations comprising:
   sending data of a second user interface to a first device, so that the first device displays the second user interface on a display screen; and the second user interface is a user interface of a second application running on the electronic device, a display screen of the first device further displays a first user interface, and the first user interface is a user interface of a first application running on the first device;
   receiving a piece of information sent by the first device, wherein the piece of information is generated after the first device detects one or more operations of moving a file object in the second user interface to the first application interface, wherein the one or more operations are detected from a plurality of different operation instructions based upon comparisons of touch operation intensities to a pressure threshold;
   executing an instruction for viewing a picture when a touch operation intensity is less than the pressure threshold;
   executing an instruction for selecting the picture when a touch operation intensity is greater than or equal to the pressure threshold;
   sending the file object to the first device in response to the piece of information, so that the first device provides a storage path of the file object or the file object for the first application, wherein the first application is a picture editing application, or a text editing application,
   after the storage path of the file object or the file object is provided for the first application, displaying the file object at an editing location of a first user interface of the first device, wherein the editing location is a location that is being edited in the first user interface before the file object is inserted or a location corresponding to the one or more operations.

18. The electronic device according to claim 17, wherein the one or more operations comprise: a touch-and-hold operation, a drag operation, a tap operation, a double-tap operation, or a force touch operation.

19. The electronic device according to claim 17, the operations further comprising:
   receiving another piece of information sent by the first device, wherein the another piece of information is generated after the first device detects one or more other operations of moving another file object on the first user interface to the second user interface;
   receiving the another file object sent by the first device in response to the another piece of information; and
   providing a storage path of the another file object or the another file object for the second application.

20. The electronic device according to claim 18, the operations further comprising:
   receiving another piece of information sent by the first device, wherein the another piece of information is generated after the first device detects one or more other operations of moving another file object on the first user interface to the second user interface;
   receiving the another file object sent by the first device in response to the another piece of information; and
   providing a storage path of the another file object or the another file object for the second application.

* * * * *